US012774696B2

(12) United States Patent
Dahan et al.

(10) Patent No.: US 12,774,696 B2
(45) Date of Patent: Oct. 27, 2026

(54) SYSTEM AND METHOD FOR GENERATION OF ELECTRICITY FROM WIND ENERGY

(71) Applicant: GLOBAL TURBULENCE LTD, Karmiel (IL)

(72) Inventors: Yehiel Dahan, Moreshet (IL); Yonatan Kashani, Netanya (IL)

(73) Assignee: Gobal Turbulence LTD, Karmiel (IL)

( * ) Notice: Subject to any disclaimer, the term of this patent is extended or adjusted under 35 U.S.C. 154(b) by 8 days.

(21) Appl. No.: 18/682,482

(22) PCT Filed: Jul. 26, 2022

(86) PCT No.: PCT/IB2022/056867
§ 371 (c)(1),
(2) Date: Feb. 9, 2024

(87) PCT Pub. No.: WO2023/017344
PCT Pub. Date: Feb. 16, 2023

(65) Prior Publication Data

US 2025/0137437 A1 May 1, 2025

Related U.S. Application Data

(60) Provisional application No. 63/231,751, filed on Aug. 11, 2021.

(51) Int. Cl.
*F03D 5/06* (2006.01)
*F03D 9/11* (2016.01)

(52) U.S. Cl.
CPC .................. *F03D 5/06* (2013.01); *F03D 9/11* (2016.05); *F05B 2220/706* (2013.01); *F05B 2280/6003* (2013.01)

(58) Field of Classification Search
CPC ........ F03D 5/06; F03D 9/11; F05B 2220/706; F05B 2280/6003
See application file for complete search history.

(56) References Cited

U.S. PATENT DOCUMENTS

| | | | |
|---|---|---|---|
| 3,995,972 | A | 12/1976 | Nassar |
| 4,024,409 | A | 5/1977 | Payne |

(Continued)

FOREIGN PATENT DOCUMENTS

| | | |
|---|---|---|
| CN | 105781883 | 7/2016 |
| DE | 102014007206 | 11/2015 |
| WO | 2016109895 | 7/2016 |

*Primary Examiner* — Viet P Nguyen
(74) *Attorney, Agent, or Firm* — Michael J. Feigin, Esq.; Feigin and Fridman LLC

(57) ABSTRACT

A system of generating electricity from wind energy. The system includes fan elongate tower, having a ground end and an upper end, the tower having a rest position in which it is substantially perpendicular to a ground surface. The system further includes a wind-harvesting assembly including at least one wind-engaging element attached to the tower, the at least one wind-engaging element adapted to be pushed by the force of wind impact, and to cause the tower to move from the rest position. The system further includes an electricity-generating subsystem, functionally associated with the ground end of the tower and including a plurality of electricity-generating elements, wherein motion of the tower from the rest position causes at least a subset of the electricity-generating elements to initiate generation of electricity.

17 Claims, 19 Drawing Sheets

(56) References Cited

U.S. PATENT DOCUMENTS

| | | | |
|---|---|---|---|
| 4,026,107 | A | 5/1977 | Kosek et al. |
| 4,239,977 | A | 12/1980 | Strutman |
| 4,580,400 | A | 4/1986 | Watabe et al. |
| 6,467,264 | B1 | 10/2002 | Stephenson et al. |
| 6,523,781 | B2 | 2/2003 | Ragner |
| 6,555,931 | B2 | 4/2003 | Mizzi |
| 7,000,376 | B2 | 2/2006 | Barisione et al. |
| 7,275,719 | B2 | 10/2007 | Olson |
| 7,418,820 | B2 | 9/2008 | Harvey et al. |
| 7,436,086 | B2 | 10/2008 | McClintic |
| 7,775,040 | B2 | 8/2010 | Khalil |
| 8,866,320 | B2 | 10/2014 | Perregrini |
| 9,444,372 | B2 | 9/2016 | Yanez-Villarreal |
| 9,732,724 | B1 | 8/2017 | Burke |
| 10,364,790 | B2 | 7/2019 | Pasanen et al. |
| 10,690,114 | B1 | 6/2020 | Haidar |
| 10,844,836 | B2 | 11/2020 | Nielbock |
| 2005/0155346 | A1 | 7/2005 | Nikolaus |
| 2007/0040389 | A1 | 2/2007 | Kelley |
| 2008/0217925 | A1 | 9/2008 | Boone et al. |
| 2009/0224553 | A1* | 9/2009 | Williams .................. F03D 5/06 290/55 |
| 2010/0158673 | A1 | 6/2010 | Keene |
| 2010/0232988 | A1 | 9/2010 | Creighton et al. |
| 2011/0030361 | A1 | 2/2011 | Gopalswamy et al. |
| 2011/0173967 | A1 | 7/2011 | Williams et al. |
| 2015/0042100 | A1 | 2/2015 | Saavedra |
| 2015/0076829 | A1 | 3/2015 | Saavedra |
| 2020/0080541 | A1 | 3/2020 | Bourgault et al. |

* cited by examiner

SYSTEM AND METHOD FOR GENERATION OF ELECTRICITY FROM WIND ENERGY

FIELD OF THE INVENTION

The present invention relates to systems and methods for harvesting natural renewable energy, and specifically to a system for harvesting wind energy to generate electricity, which system blends naturally into the view.

BACKGROUND OF THE INVENTION

Use of natural renewable energy for human purposes has been known for centuries. For example, windmills, in the modern form, have been known from the $8^{th}$ or $9^{th}$ centuries.

Over the past few decades, with increased use of fossil fuel-based energy in vehicles and for the industry, harnessing of renewable energy for production of electricity has been increasingly popular. As a result, and many technologies have been developed for harvesting natural renewable energy for generation of electricity. For example, wind turbines are now commonly used to generate electricity from the power of the wind.

However, most wind energy harvesting systems are large and bulky. Wind energy is typically harvested in uninhabited spaces, such as open fields, lakes, and oceans. However, in these locations, the wind-harvesting systems are often eyesores, disrupting the natural view.

Additionally, since the energy harvesting locations are typically distant from the locations at which the energy is used, energy and funds are required to make the harvested energy actually usable. Thus, the net gain in energy from harvesting natural power is reduced.

Furthermore, typical wind energy harvesting systems are oriented to harvest wind coming from a specific direction. This is very suitable for locations such as the sea-shore, where there is a specific direction in which the wind typically blows. However, it is less suitable for locations at which the wind may blow in multiple directions, since in such locations some of the wind energy will not be harvested, and will be wasted.

There is thus a need in the art for a system for harvesting wind energy which can be used within urban locations as well as in open fields, without disrupting the view. There is also a need in the art for a system that can harvest wind energy regardless of the direction in which the wind is blowing.

SUMMARY OF THE INVENTION

The present invention relates to systems and methods for harvesting natural renewable energy, and specifically to a system for harvesting wind energy to generate electricity, which system blends naturally into the view.

In accordance with some embodiments of the disclosed technology, there is provided a system of generating electricity from wind energy. The system includes an elongate tower, having a ground end and an upper end, the tower having a rest position in which it is substantially perpendicular to a ground surface. The system further includes a wind-harvesting assembly including at least one wind-engaging element attached to the tower, the at least one wind-engaging element adapted to be impacted by wind, and to cause the tower to move from the rest position. The system may further include a hydraulic subsystem, including at least one hydraulic actuator functionally associated with the ground end of the tower, each of the at least one hydraulic actuator including a hydraulic cylinder having a corresponding piston disposed therein, wherein motion of the tower from the rest position causes motion of at least one the piston and pressurizing of fluid in at least one corresponding the hydraulic actuator. The system may further include an electricity-generating subsystem, functionally associated with the hydraulic subsystem and adapted to use the pressurized fluid to generate electricity.

In some embodiments, the wind-harvesting assembly is attached to the upper end of the tower. In some embodiments, the wind-harvesting assembly is attached to the body of the tower, along a segment of the longitudinal length thereof.

In some embodiments, the at least one hydraulic actuator includes a single hydraulic actuator, wherein motion of the tower from the rest position causes motion of the piston and pressurizing of fluid in the hydraulic actuator. In some embodiments, the single hydraulic actuator is disposed alongside or beneath, the ground end of the elongate tower.

In some embodiments, the at least one hydraulic actuator includes a plurality of hydraulic actuators, wherein motion of the tower from the rest position causes motion of a subset of the pistons and pressurizing of fluid in corresponding ones of the plurality of hydraulic actuators. In some embodiments, the plurality of hydraulic actuators are disposed circumferentially about, or beneath, the ground end of the elongate tower.

In some embodiments, at least one axis of motion of the at least one piston within the at least one hydraulic actuator is substantially perpendicular to a longitudinal axis of the elongate tower.

In some embodiments, at least one axis of motion of the at least one piston within the at least one hydraulic actuator is substantially parallel to a longitudinal axis of the elongate tower.

In some embodiments, the elongate tower is formed of a rigid material. In some embodiments, the rigid material includes carbon fiber.

In some embodiments, the wind-harvesting assembly has a natural appearance that blends into the view.

In some embodiments, the wind-harvesting assembly includes a plurality of branches extending outwardly from the elongate tower, each of the plurality of branches terminating in at least one wind-engaging leaf, such that the wind-harvesting assembly has the appearance of a tree-top and includes a plurality of wind-engaging elements. In some embodiments, the wind-harvesting assembly has the appearance of a palm-tree top.

In some embodiments, the wind-harvesting assembly includes a bulletin board.

In some embodiments, a range of motion of the at least one piston is adapted to limit an extent of motion of the tower.

In some embodiments, upon being impacted by the wind, the wind-harvesting assembly is adapted to cause the tower to tilt from the rest position.

In some embodiments, upon being impacted by the wind, the wind-harvesting assembly is adapted to cause the tower to rotate relative to the rest position.

In some embodiments, the electricity-generating subsystem including an atmospheric-pressure fluid reservoir, in fluid communication with the hydraulic subsystem and adapted to provide fluid, at atmospheric pressure, to the at least one hydraulic actuator; a pressurized-fluid tank, in fluid communication with the hydraulic subsystem and adapted to receive pressurized fluid from the at least one hydraulic actuator; and an electricity generator adapted to receive pressurized fluid from the pressurized-fluid tank, to use pressure of the fluid to generate electricity, and, following the generating of electricity, to provide fluid at atmospheric pressure to the atmospheric-pressure fluid reservoir.

In some embodiments, the system further includes a solenoid valve disposed between the pressurized-fluid tank and the electricity generator.

In some embodiments, the system further includes at least one unidirectional valve controlling flow of fluid from the electricity generator to the atmospheric-pressure fluid reservoir.

In some embodiments, each of the at least one hydraulic actuator is in fluid communication with the atmospheric-pressure fluid reservoir and with the pressurized-fluid tank via a single conduit, and wherein flow of atmospheric pressure fluid and pressurized fluid through the conduit is controlled by a plurality of valves disposed along fluid lines between the atmospheric-pressure fluid reservoir and the at least one hydraulic actuator, and between the at least one hydraulic actuator and the pressurized-fluid tank.

In some embodiments, the hydraulic subsystem further includes a housing and a central core. In some embodiments, the central core is tiltable and rotatable relative to the housing. In some embodiments, each of the at least one hydraulic cylinder is attached to the housing at a first anchoring point, and each corresponding piston is attached to the central core at a second anchoring point, such that at least one longitudinal axis of the at least one piston is substantially perpendicular to a longitudinal axis of the tower. Motion of the central core relative to the housing changes a distance between the first anchoring point and the second anchoring point, resulting in motion of the corresponding at least one hydraulic piston relative to the at least one hydraulic cylinder.

In some embodiments, the tower is fixedly attached to the central core, and wherein rotation of the tower relative to the housing causes rotation of the central core, and relative motion between at least the one of the at least one hydraulic cylinder and corresponding at least one hydraulic piston.

In some embodiments, tilting of the tower relative to the housing causes tilting of the central core, and relative motion between at least one of the at least one hydraulic cylinder and corresponding at least one hydraulic piston.

In some embodiments, the hydraulic subsystem further includes a housing having a base surface, the housing accommodating the at least one hydraulic actuator. In some embodiments, the elongate tower is functionally associated with a plate, tiltable and rotatable relative to the housing. In some embodiments, each of the at least one hydraulic cylinder is attached to the base surface of the housing at a first anchoring point, and each corresponding piston is attached to a lower surface of the base plate, such that at least one longitudinal axis of the at least one piston is substantially parallel to a longitudinal axis of the tower. Motion of the base plate relative to the housing changes a distance between the first anchoring point and the second anchoring point, resulting in motion of the corresponding at least one hydraulic piston relative to the at least one hydraulic cylinder.

In accordance with embodiments of the disclosed technology, there is provided a system of generating electricity from wind energy. The system includes an elongate tower, having a ground end and an upper end, the tower having a rest position in which it is substantially perpendicular to a ground surface. The system further includes a wind-harvesting assembly including at least one wind-engaging element attached to the tower, the at least one wind-engaging element adapted to be pushed by the force of wind impact, and to cause the tower to move from the rest position. The system further includes an electricity-generating subsystem, functionally associated with the ground end of the tower and including a plurality of electricity-generating elements, wherein motion of the tower from the rest position causes at least a subset of the electricity-generating elements to initiate generation of electricity.

In some embodiments, the wind-harvesting assembly is attached to the upper end of the tower. In some embodiments, the wind-harvesting assembly is attached to the body of the tower, along a segment of the longitudinal length thereof.

In some embodiments, the electricity-generating subsystem includes a hydraulic subsystem, including at least one hydraulic actuator functionally associated with the ground end of the tower, each of the at least one hydraulic actuator including a hydraulic cylinder having a corresponding piston disposed therein, wherein motion of the tower from the rest position causes motion of at least one the piston and pressurizing of fluid in at least one corresponding the hydraulic actuator, and an electricity-generator, functionally associated with the hydraulic subsystem and adapted to use the pressurized fluid to generate electricity.

In some embodiments, the electricity-generating subsystem includes an array of linear actuators, functionally associated with the ground end of the tower, wherein motion of the tower from the rest position causes compression or extension of at least a subset of the linear actuators in the array, which compression or extension generates an electric charge.

In some embodiments, the electricity-generating subsystem includes an array of piezoelectric motors, functionally associated with the ground end of the tower, wherein motion of the tower from the rest position causes compression or extension of at least a subset of the piezoelectric motors in the array, which compression or extension generates an electric charge.

In some embodiments, the system further includes a battery for storing the generated electricity.

In some embodiments, the elongate tower is formed of a rigid material. In some embodiments, the rigid material comprises carbon fiber.

In some embodiments, the wind-harvesting assembly has a natural appearance that blends into the view.

In some embodiments, the wind-harvesting assembly comprises a plurality of branches extending outwardly from the elongate tower, each of the plurality of branches terminating in at least one wind-engaging leaf, such that the wind-harvesting assembly has the appearance of a tree-top and includes a plurality of wind-engaging elements. In some embodiments, the wind-harvesting assembly has the appearance of a palm-tree top.

In some embodiments, the wind-harvesting assembly comprises a bulletin board.

In some embodiments, upon being impacted by the wind, the wind-harvesting assembly is adapted to cause the tower to tilt from the rest position.

In some embodiments, upon being impacted by the wind, the wind-harvesting assembly is adapted to cause the tower to rotate relative to the rest position.

BRIEF DESCRIPTION OF THE FIGURES

The foregoing discussion will be understood more readily from the following detailed description of the invention, when taken in conjunction with the accompanying Figures, in which.

DESCRIPTION OF THE PREFERRED EMBODIMENTS

Figure 1:
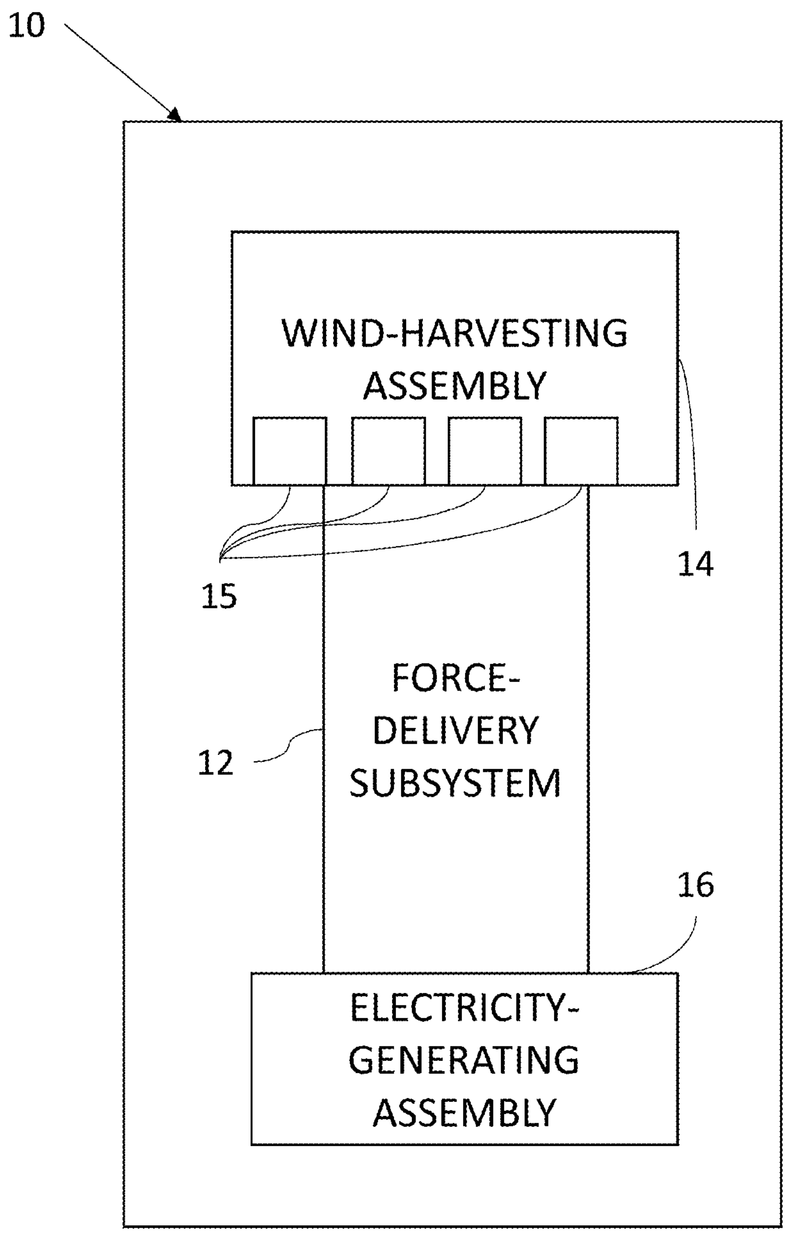
FIG. 1 is a schematic block diagram of a system for harvesting wind energy, according to embodiments of the disclosed technology.

The principles of the inventive wind-energy harvesting system may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

For the purposes of the present disclosure, the term "substantially" is defined as "at least 90% of" or "within 10% deviation of".

Reference is now made to FIG. 1, which is schematic block diagram of a system 10 for harvesting wind energy, according to embodiments of the disclosed technology. As seen in FIG. 1, system 10 includes a force-delivery subsystem 12, disposed between a wind-harvesting assembly 14 and an electricity-generating assembly 16.

Typically, force-delivery subsystem 12 comprises a tower or mast, having wind-harvesting assembly 14 attached thereto, and electricity-generating assembly 16 disposed at a lower end thereof. However, any other suitable arrangement is considered within the scope of the disclosed technology. Force-delivery subsystem 12 must be sufficiently rigid so as to delivery at least the majority of wind energy, captured by wind-harvesting assembly 14 to electricity-generating subsystem 16, and not to bend, bow, or buckle under the impact of the force of the wind on the wind-harvesting assembly 14.

As explained in further detail hereinbelow, wind-harvesting assembly may include one or more wind-harvesting elements 15, adapted to be impacted by the force of the wind. When the wind impacts the wind-harvesting element(s) 15, the wind-harvesting element(s) cause force-delivery subsystem 12 to deliver the force of the wind to electricity-generating assembly 16, for generation of electricity therefrom.

In some embodiments, wind-harvesting element(s) 15 is designed to have a natural appearance and to blend into the view, as illustrated in FIGS. 2A to 2E. In some embodiments, force-delivery subsystem 12 may also be designed to have an appearance that blends into nature, as explained hereinbelow.

In some embodiments, wind-harvesting element(s) 15 may be designed to look like kites, gliders, or the like.

Typically, wind-harvesting element(s) 15 are selected such that they are impacted by the wind regardless of the direction from which the wind is blowing, and are susceptible to the turbulence of the wind. In this manner the wind-harvesting element(s) can maximize the force applied to force-delivery subsystem 12 and used for generating electricity.

Electricity-generating assembly 16 may include any suitable electricity-generating elements, which are adapted to use the force delivered by force-delivery subsystem 12 to generate electricity. For example, electricity-generating assembly 16 may include a hydraulic subsystem adapted to use the force delivered by force-delivery subsystem 12 to pressurize fluid, and to generate electricity from the pressurized fluid. In the context of the present specification and claims, the term "hydraulic" is considered to include a system using force to pressurize a fluid, be the fluid liquid or gas. In this context, the hydraulic system may be a pneumatic system.

As another example, electricity-generating assembly 16 may include an array of linear actuators or piezoelectric motors adapted to be compressed or extended by the force delivered by force-delivery subsystem 12 thereby to generate electricity.

Reference is now made to FIGS. 2A, 2B, 2C, 2D, and 2E which are schematic side view illustrations of systems for harvesting wind energy, according to embodiments of the disclosed technology. The systems of FIGS. 2A to 2E are various implementations of system 10 described herein with respect to FIG. 1.

In FIG. 2A to 2D, system 100 includes a tower 110 having a ground end 110*a* and an upper end 110*b*, which tower functions as force-delivery subsystem 12. Ground end 110*a* is attached to a hydraulic subsystem 120, which is functionally associated with an electricity-generating subsystem 140. The hydraulic subsystem 120 and electricity-generating subsystem 140 together form the electricity-generating assembly 16 of FIG. 1. Tower 110 terminates, at upper end 110*b*, in a wind-harvesting assembly 160.

In some embodiments, wind-harvesting assembly 160 is designed to have a natural appearance and to blend into the view.

Figure 2A:
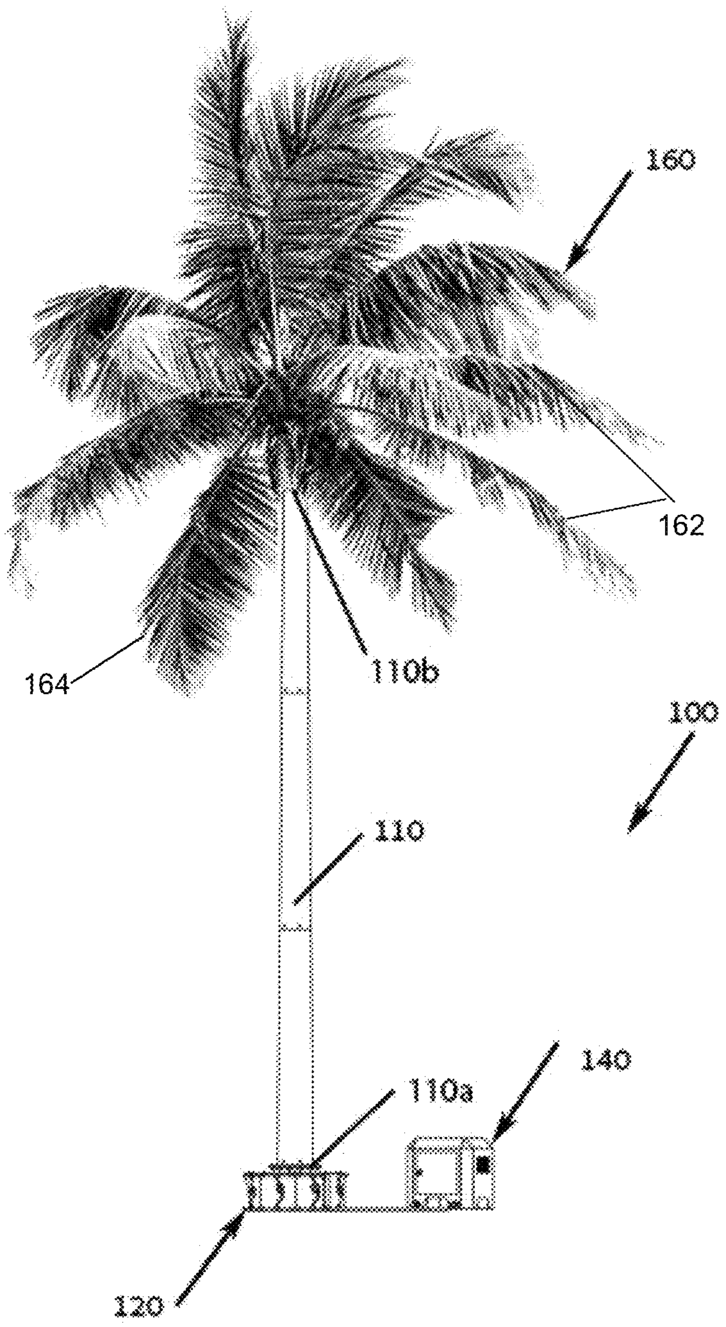
FIGS. 2A, 2B, 2C, 2D, and 2E are schematic side view illustrations of systems for harvesting wind energy, according to embodiments of the disclosed technology.

For example, in FIG. 2A, the wind-harvesting assembly is designed to look like the top of a palm tree. As another example, in FIG. 2B, the wind-harvesting assembly is designed to look like the top of a tree. Since trees are commonplace in many areas on the globe, system 100 as shown in FIG. 2A would blend into nature, and would not be an eye-sore, in those areas. The tree-like structure is also advantageous for harvesting wind energy, since it has leaves extending in all directions and thus will be impacted by the wind regardless of the direction from which the wind blows or of the turbulence of the wind, as described in further detail hereinbelow.

In some embodiments, tower 110 may also be covered to have the appearance of the trunk of a tree, corresponding to the tree-top appearance of the wind-harvesting assembly 160, further enabling the system to blend into nature.

In some embodiments, in which system 100 is designed to have the appearance of a tree, a plurality of branches 162 may extend from tower 110 to form the wind-harvesting assembly 160. Each of branches 162 may have disposed thereon one or more leaf-like wind-harvesting elements 164, as explained in further detail hereinbelow.

Figure 2B:
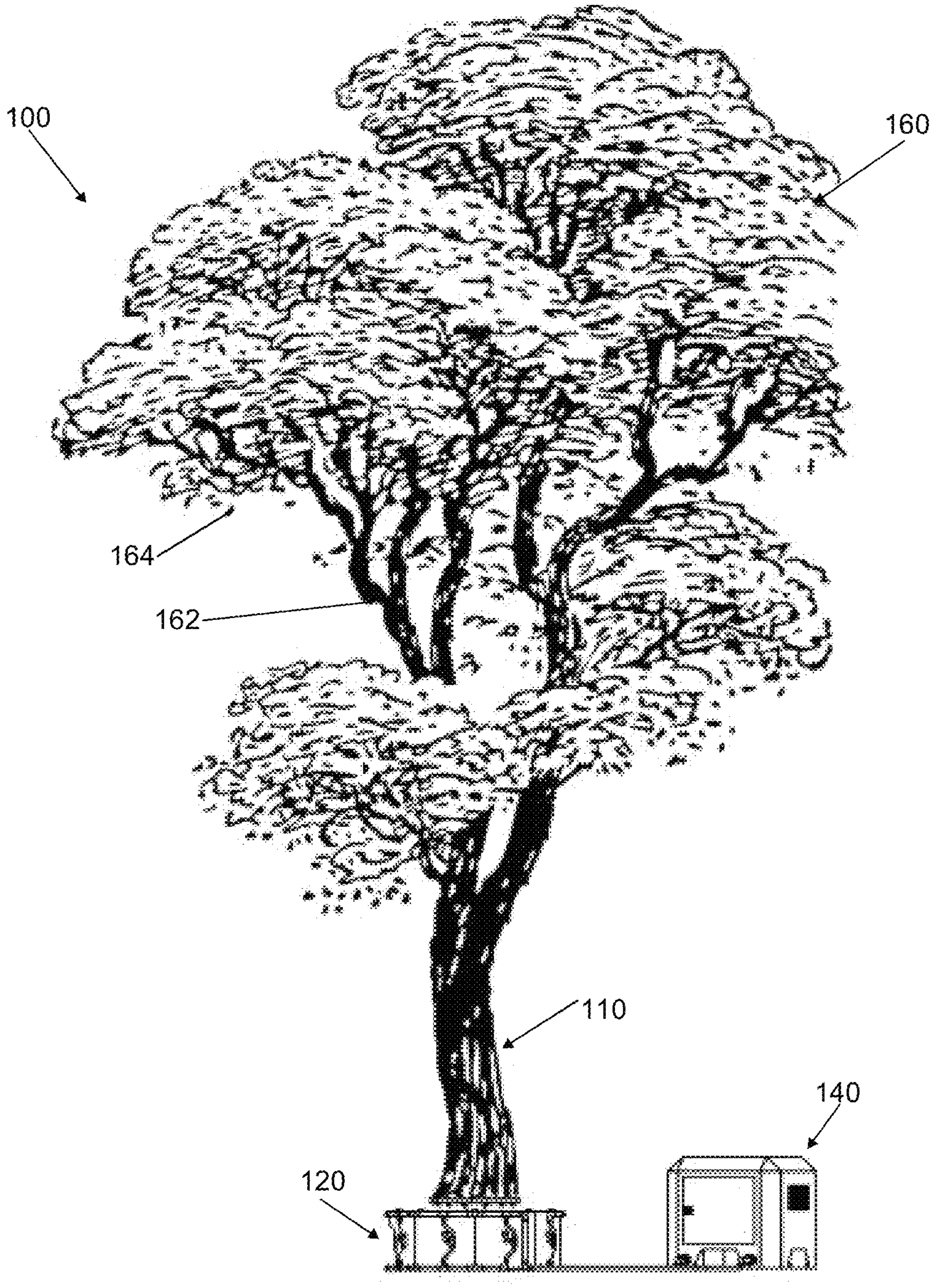

In some such embodiments, the branches may branch off the central tower relatively close to the ground end of the tower, as shown in FIG. 2B. In some embodiments, the tower may continue substantially vertically after the branching point, and in other embodiments the tower may terminate at the branching point, and have a plurality of branches extending in various directions. However, regardless of where the branches are located relative to the tower or the angle at which they are located, as long as wind impacting to the wind-engaging elements connected to the branches causes motion of the tower (and possibly of branches thereof, the system is considered within the scope of the teachings herein.

Figure 2C:
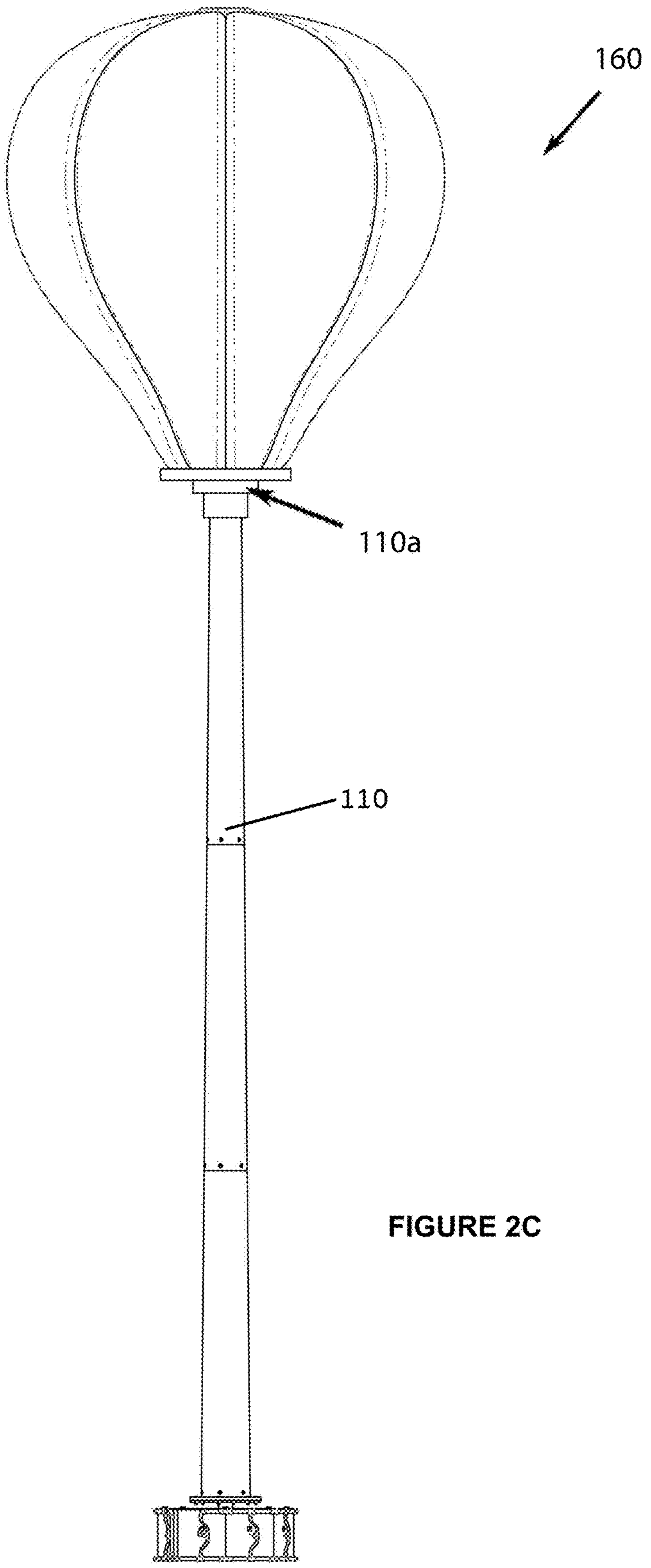

In FIG. 2C, wind-harvesting assembly 160 includes a large balloon 200, shaped similarly to a hot air balloon. Balloon 200 is attached to upper end 110*a* of tower 110, such that tilting or swaying of balloon 200 in the wind causes corresponding motion of tower 110, and generation of electricity as explained hereinbelow. Because balloon 200 is symmetrical about 360 degrees thereof, it is susceptible to winds in all directions, and would support generation of electricity regardless of the direction in which the wind is blowing.

Figure 2D:
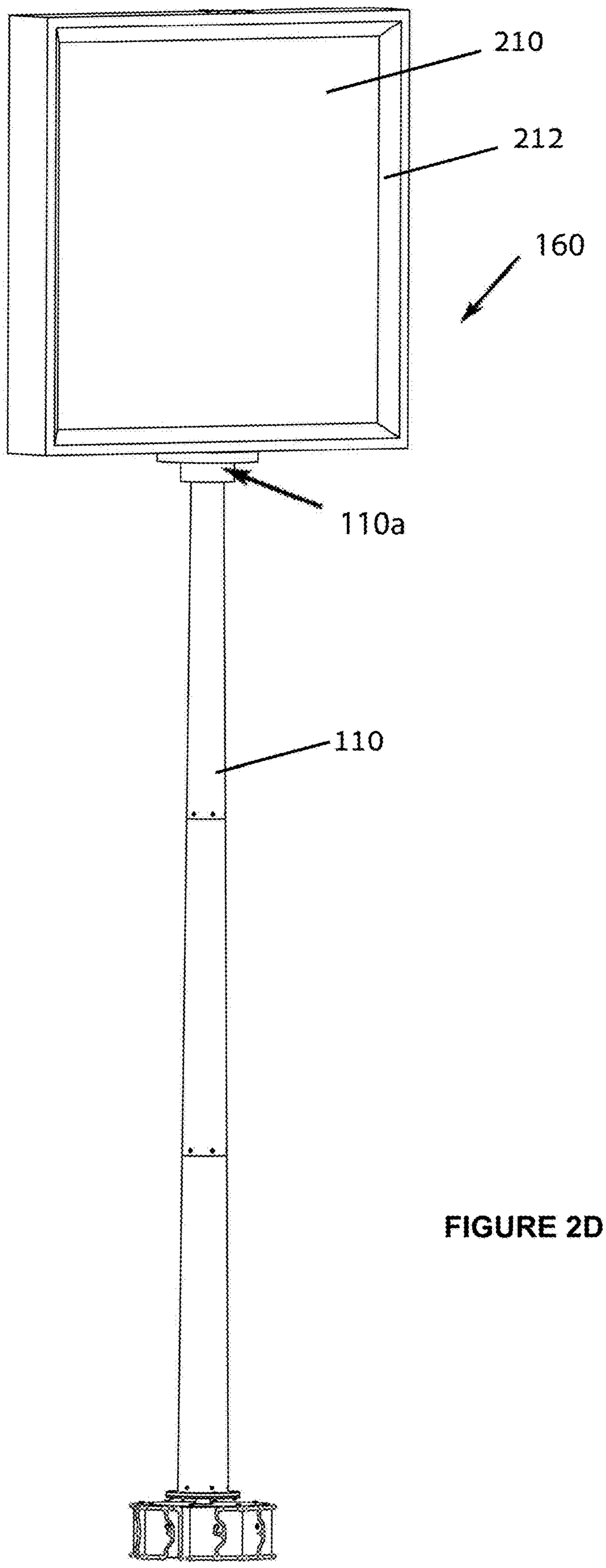

In FIG. 2D, it is seen that wind-harvesting assembly 160 includes a large billboard 210, surrounded by a frame 212, for example as found in many urban areas, as well as along roads and highways. Billboard 210 is attached to upper end 110*a* of tower 110, such that tilting or swaying of billboard 210 in the wind causes corresponding motion of tower 110, and generation of electricity as explained hereinbelow. In some embodiments, billboard 210 may be rotatable relative to tower 110, in order to be able to turn in the direction in which the wind is blowing, similarly to a weather vane, so as to support generation of electricity regardless of the direction in which the wind is blowing.

Figure 2E:
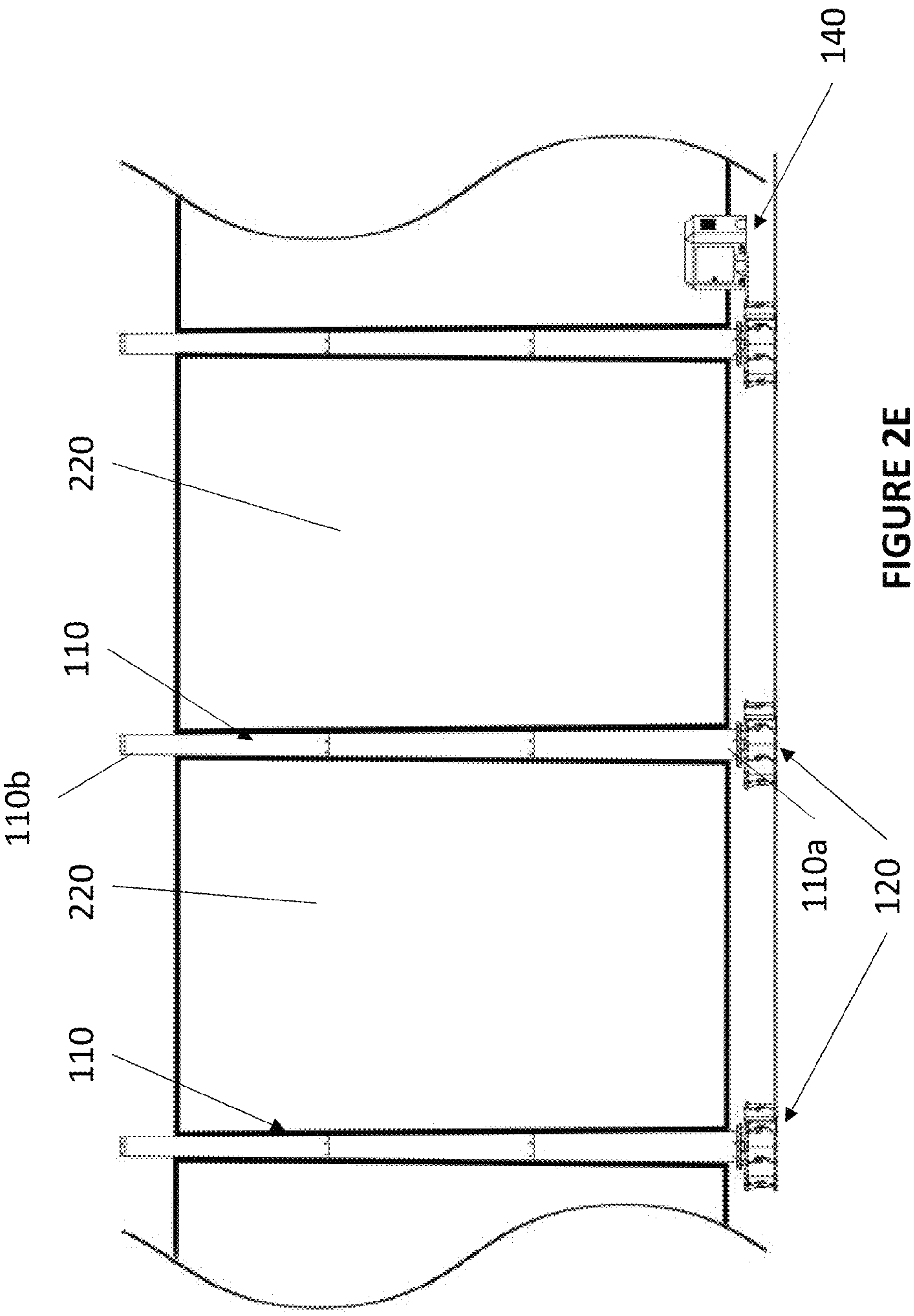

In FIG. 2E, system 100 includes a plurality of towers 110, each having a ground end 110*a* and an upper end 110*b*. Each of the towers functions as force-delivery subsystem 12. Ground end 110*a* of each tower 110 is attached to a hydraulic subsystem 120. The hydraulic subsystems 120 are functionally associated with one or more electricity-generating subsystem 140. The hydraulic subsystems 120 and electricity-generating subsystem(s) 140 together form the electricity-generating assembly 16 of FIG. 1.

In the embodiment of FIG. 2E, wind harvesting panels 220 are stretched between each pair of adjacent towers 110, and are attached to the towers along the longitudinal length thereof. As such, towers 110 together with panels 220 form a fence. The fence may be as long as desired, and may include any number of towers, hydraulic subsystems, and panels. However, in embodiments in which the fence is long, multiple electricity-generating subsystems 140 may be used in order to reduce the distance that pressurized fluid travels from the hydraulic subsystems 120 to the nearest electricity-generating subsystem 140.

Figure 3:
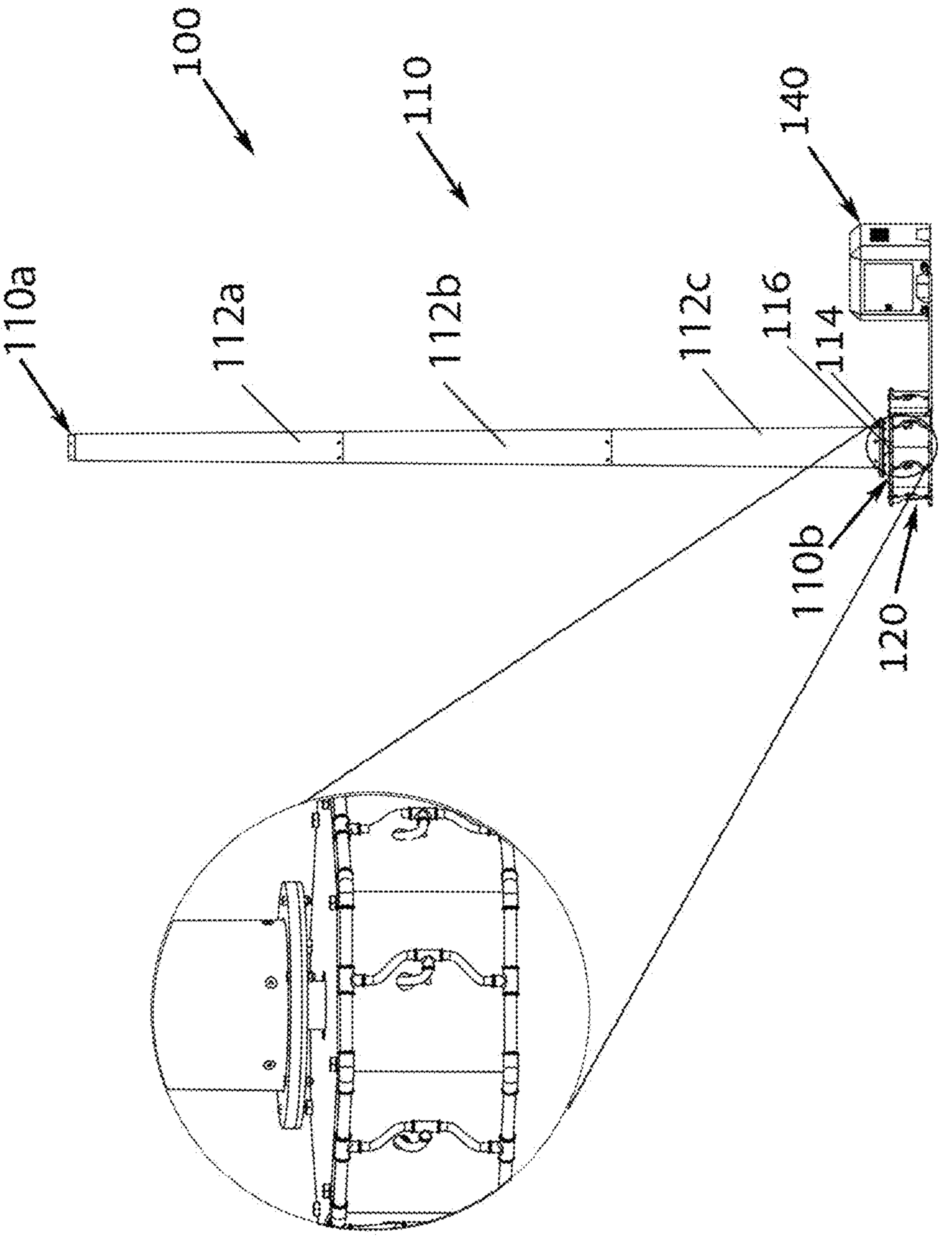
FIG. 3 is a schematic side view illustration of the system of FIGS. 2A to 2E, having a wind-harvesting assembly removed therefrom.

Reference is now made to FIG. 3, which is a schematic side view illustration of the system 100 of any one of FIGS. 2A to 2E, having a wind-harvesting assembly 160 removed therefrom.

As seen in FIG. 3, tower 110 may be constructed from multiple segments, here shown as segments 112*a*, 112*b*, and 112*c*. In some embodiments, the diameter of each segment is gradated, such that a diameter at an upper end of the segment is smaller than a diameter at a lower end of the segment. For example, in the illustrate embodiment, the diameter of segment 112*a* adjacent upper end 110 is greater than the diameter of segment 112*a* adjacent segment 112*b*.

The lowest segment, here shown as segment 112*c*, terminates at a base plate 114 which has a greater diameter than the adjacent segment. Base plate 114 is adapted to be disposed above at least a portion of the electricity-generating assembly 16 (FIG. 1), and in the illustrated embodiment above hydraulic subsystem 120. Thus, base plate 114 limits tilting of tower 110 relative to hydraulic subsystem 120, as explained in further detail hereinbelow. A stem 116 extends longitudinally from base plate 114, away from segment 112*c*. Stem 116 is adapted to be disposed within, and functionally associated with, components of hydraulic subsystem 120, and to transfer tilt forces of tower 110 to the hydraulic subsystem, as explained in further detail with respect to FIGS. 6A to 7.

Typically, tower 110 is formed of a rigid material, so that the tower will tilt when wind force is applied thereto, rather than bending. However, tower 110 must also be sufficiently light to be carried by hydraulic subsystem 120, and sufficiently strong to bear the weight of wind-harvesting assembly 160. It is desirable that the material used for formation of the tower transmit a maximal portion of the momentum, or force, from the top of the tower to the base thereof, similarly to the mast of a boat. In some embodiments, tower 110 may be formed of a metal, such as aluminum, e.g. corrugated aluminum panels. In some embodiments, tower 110 may be formed of a carbon-based material, such as carbon fiber.

Figure 4:
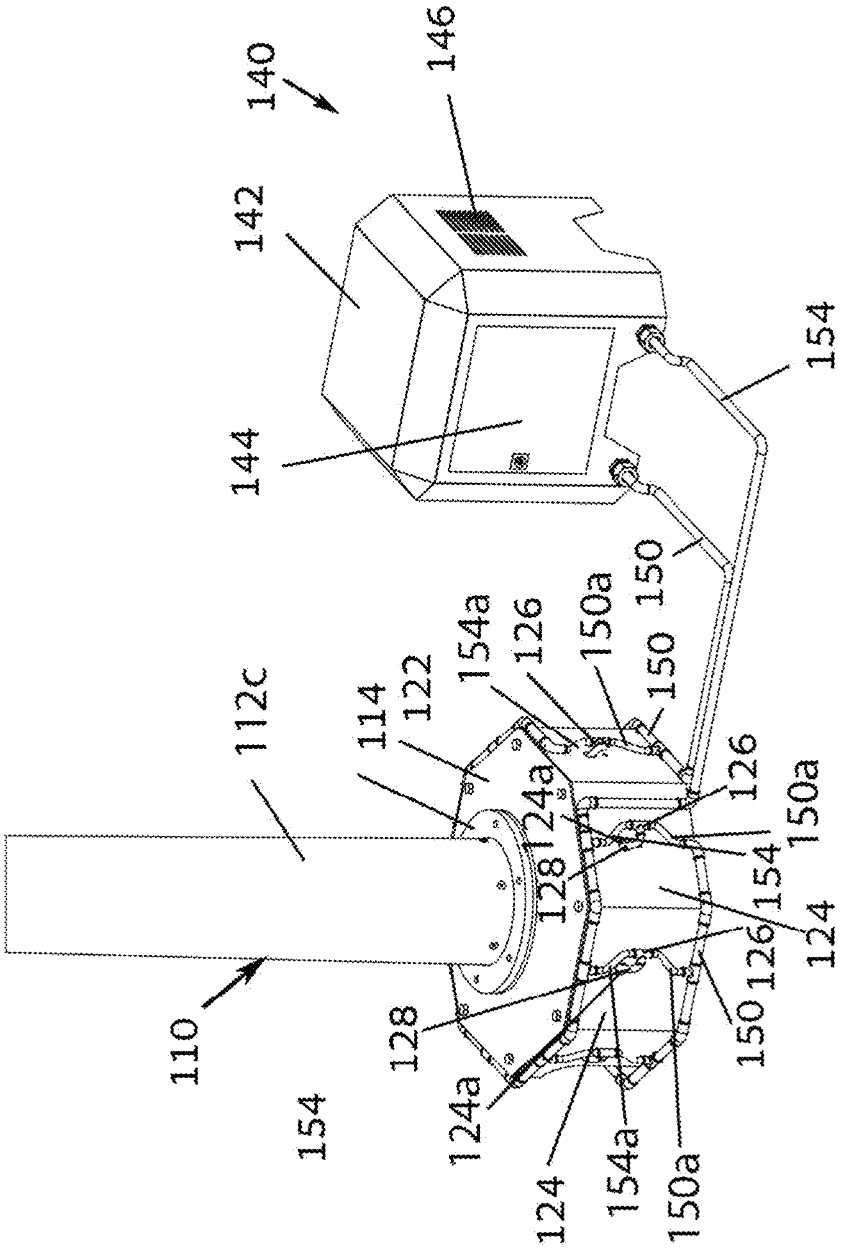
FIG. 4 is a perspective view illustration of a hydraulic subsystem and an electricity-generating subsystem forming part of the system of FIGS. 2A to 2E, according to some embodiments of the disclosed technology.

Reference is now additionally made to FIG. 4, which is a perspective view illustration of hydraulic subsystem 120 and electricity-generating subsystem 140 forming part of system 100, according to some embodiments of the disclosed technology.

As seen in FIG. 4, electricity-generating subsystem 140 includes a housing 142, which may include one or more portals 144 for accessing components of the subsystem, and one or more heat releasing mechanisms, such as vents 146.

Figure 5:
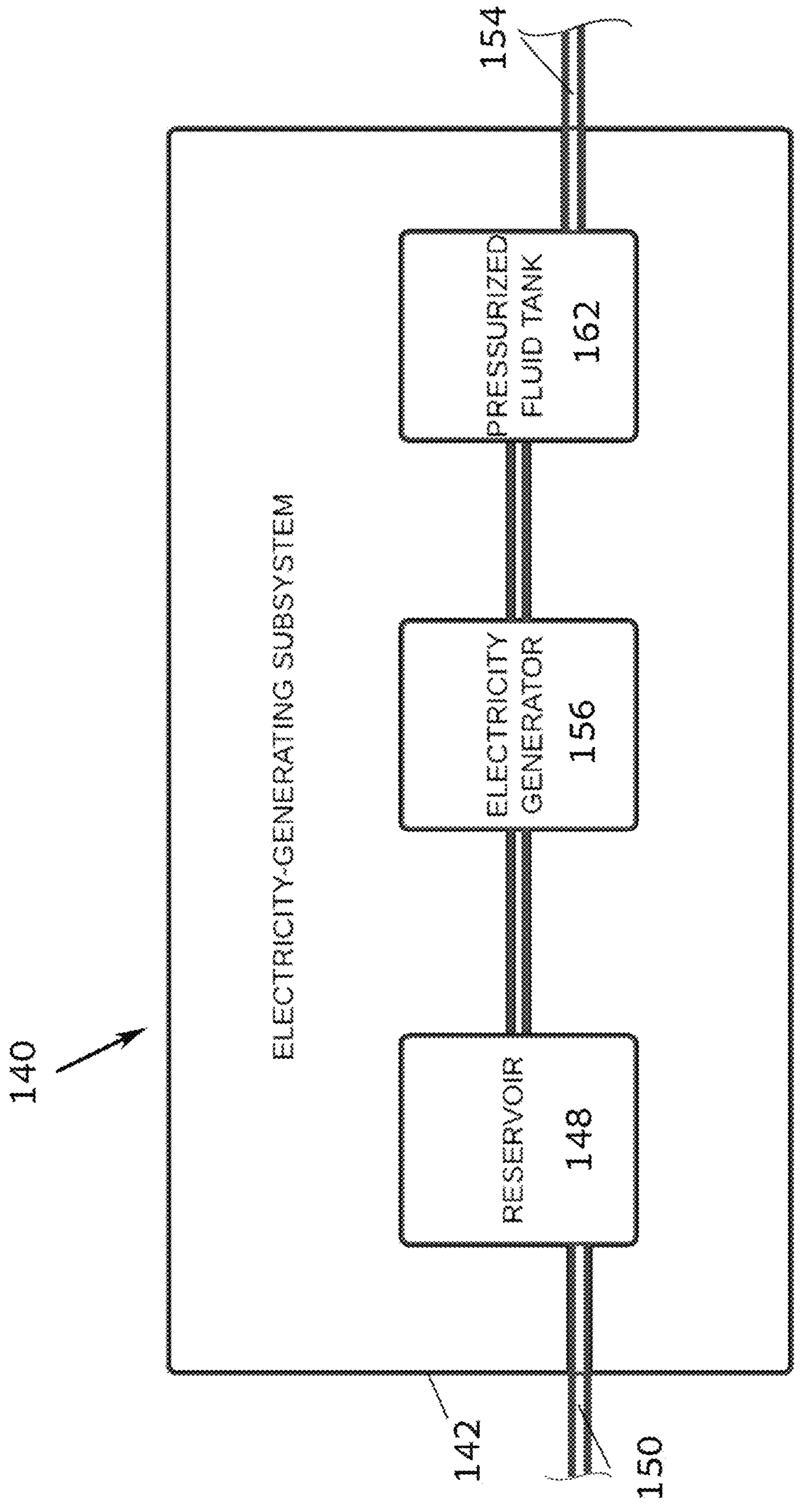
FIG. 5 is a schematic block diagram of the electricity-generating subsystem of FIG. 4, according to some embodiments of the disclosed technology.

Referring additionally to FIG. 5, which is a schematic block diagram of electricity-generating subsystem 140, it is seen that disposed within housing 142 is an atmospheric-pressure fluid reservoir 148, which is in fluid communication with an atmospheric-pressure pipe 150 extending out of housing 142, toward hydraulic subsystem 120. A pressurized-fluid tank 152 receives pressurized fluid from a high-pressure pipe 154, arriving at electricity-generating subsystem 140 from hydraulic subsystem 120. Pressurized-fluid tank 152 is functionally associated with an electricity generator 156, such as a turbine.

As is known in similar electricity-generating subsystems, in use, high-pressure fluid from tank 152 is used by turbine 156 to generate electricity, which causes the fluid to return to atmospheric pressure. The fluid is then returned to reservoir 148 for recycling thereof.

Returning to FIG. 4, it is seen that hydraulic subsystem 120 includes a housing comprising an upper housing surface 122, and a plurality of side surfaces 124.

Atmospheric-pressure pipe 150 extends along the base of each of side surfaces 124, adjacent the ground, such that a conduit 150*a* extends from pipe 150 to a multi-directional valve 126 on each side surface 124. Similarly, high-pressure pipe 154 extends along the top of each of side surfaces 124, adjacent upper housing surface 122, such that a conduit 154*a* extends from pipe 154 to multi-directional valve 126. A conduit 128 extends from multi-directional valve 126 into a bore 124*a* in each side surface 124, for fluid communication with components of hydraulic subsystem 120 as explained hereinbelow.

Figure 8:
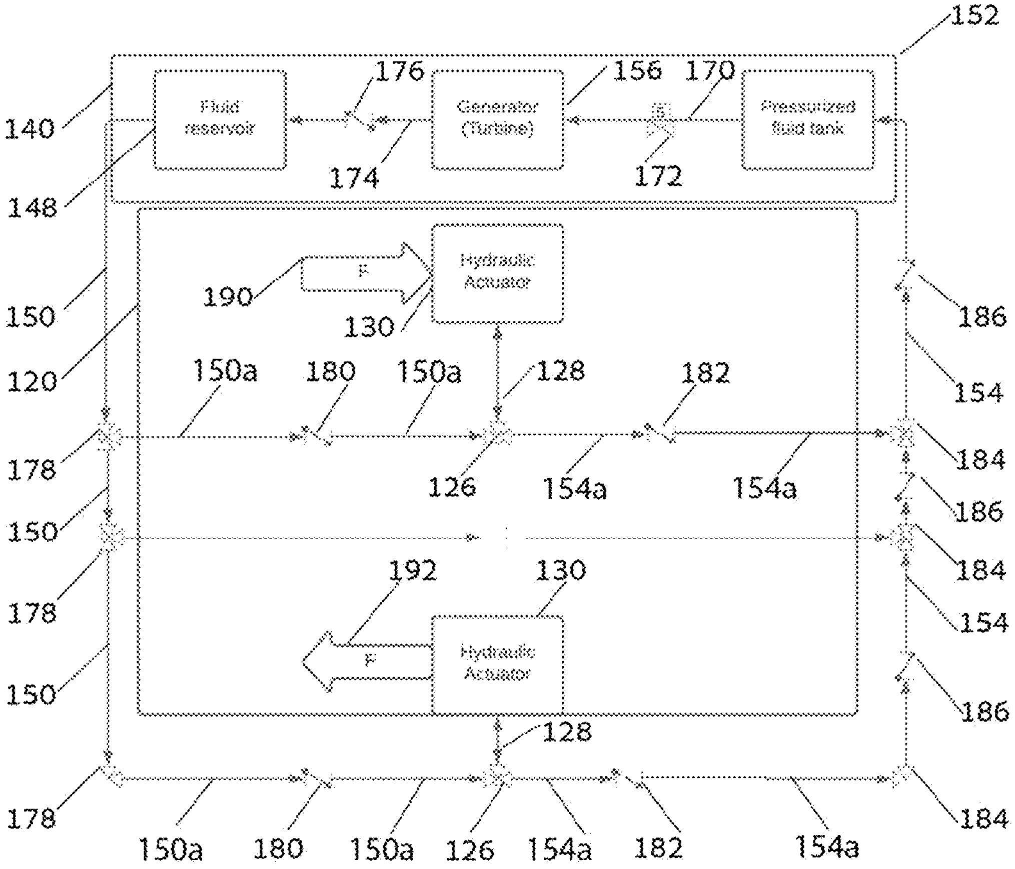
FIG. 8 is a schematic diagram of fluid communications between the hydraulic subsystem and the electricity-generating subsystem, according to some embodiments of the disclosed technology.

It is appreciated that the order of atmospheric-pressure pipe 150 and high-pressure pipe 154 may be reversed, e.g. that atmospheric pressure pipe 150 would extend along the top of side surfaces 124 and that high-pressure pipe 154 would extend close to the ground. However, in such a case, the various valves connecting components of the hydraulic system, as shown in FIG. 8, must be modified to accommodate the change in the flow.

Figure 6A:
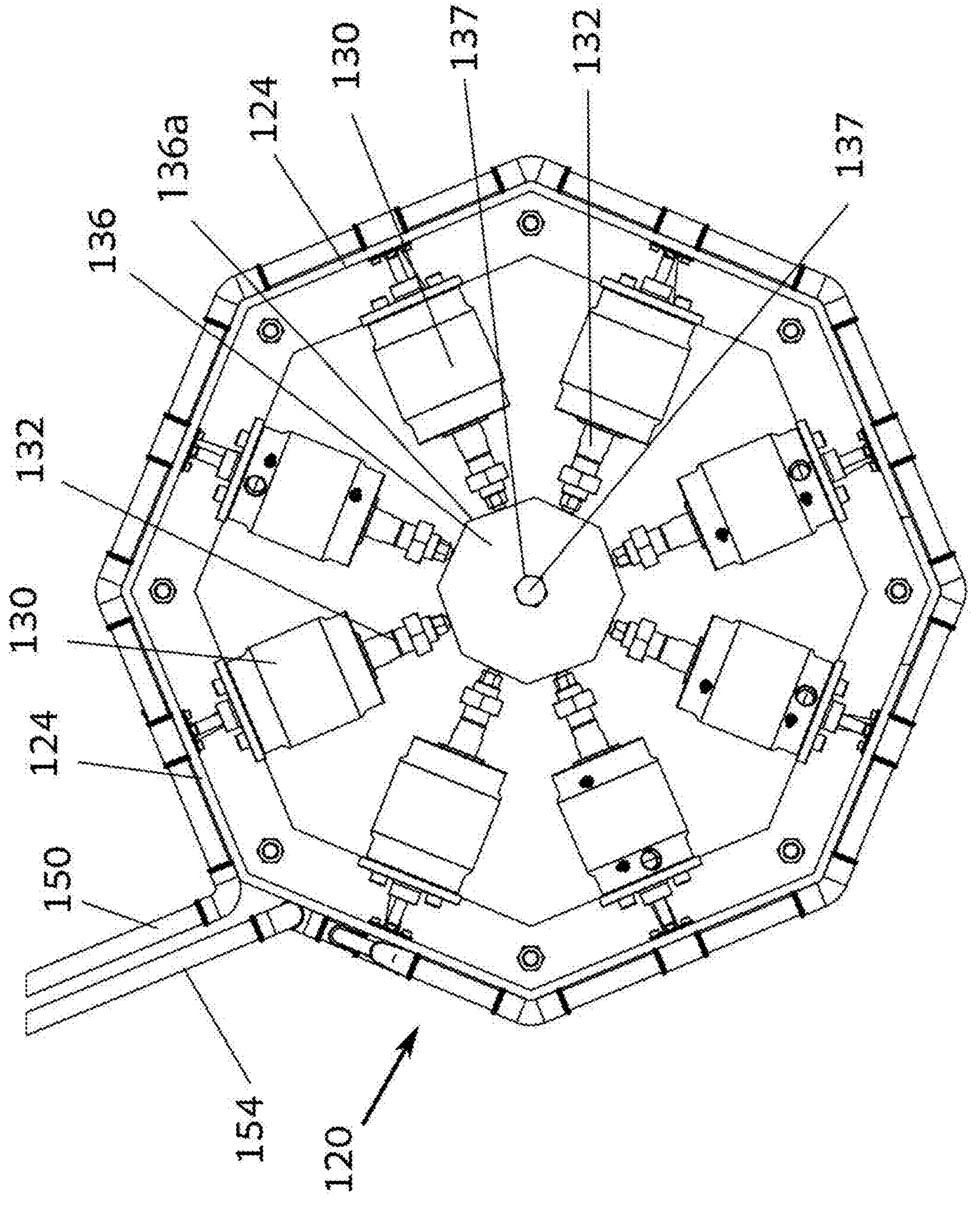
FIGS. 6A, 6B, and 6C are, respectively, bottom view planar illustrations of the hydraulic subsystem of FIG. 4 in a rest state and in two twist states, according to some embodiments of the disclosed technology.
Figure 6B:
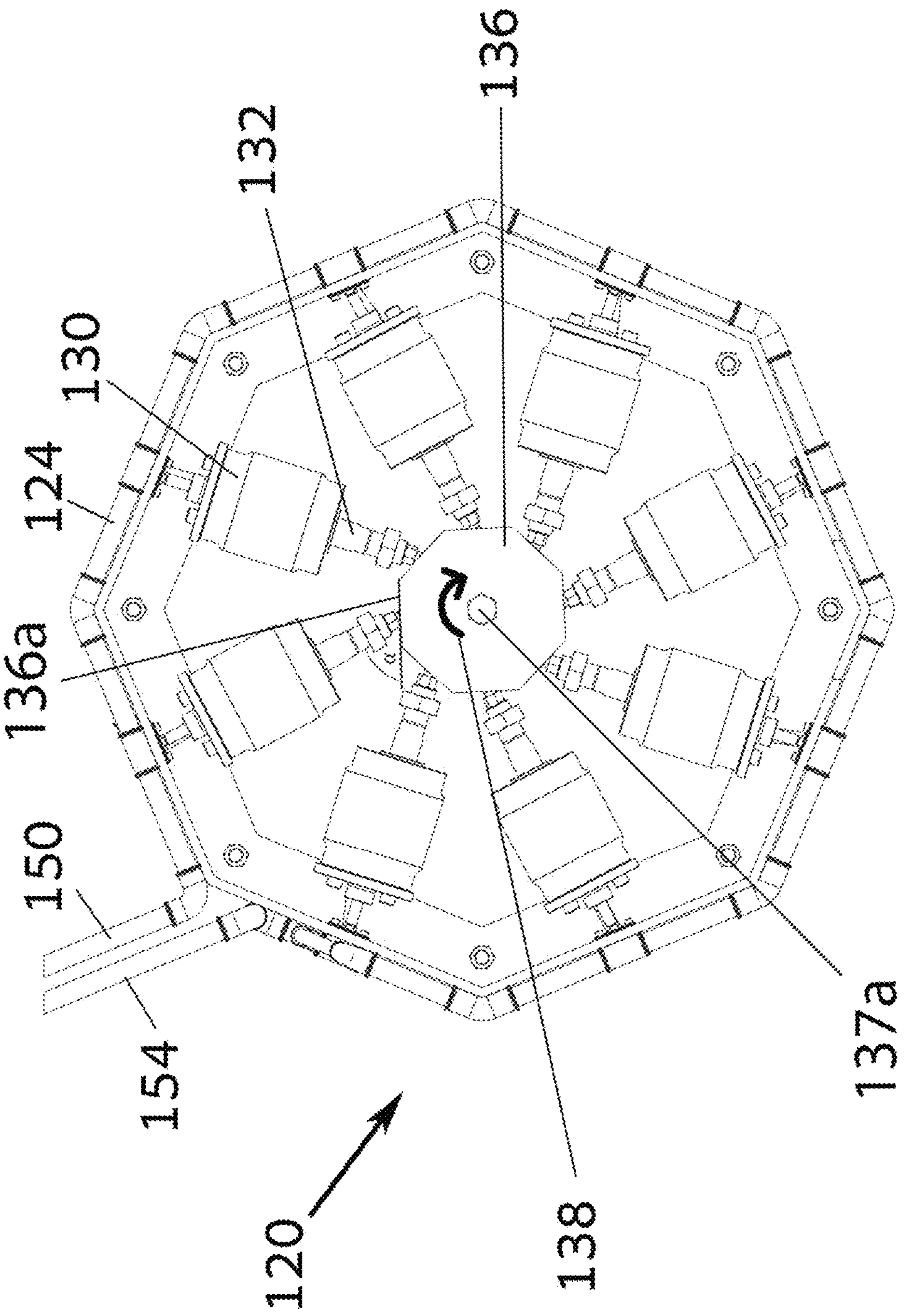
Figure 6C:
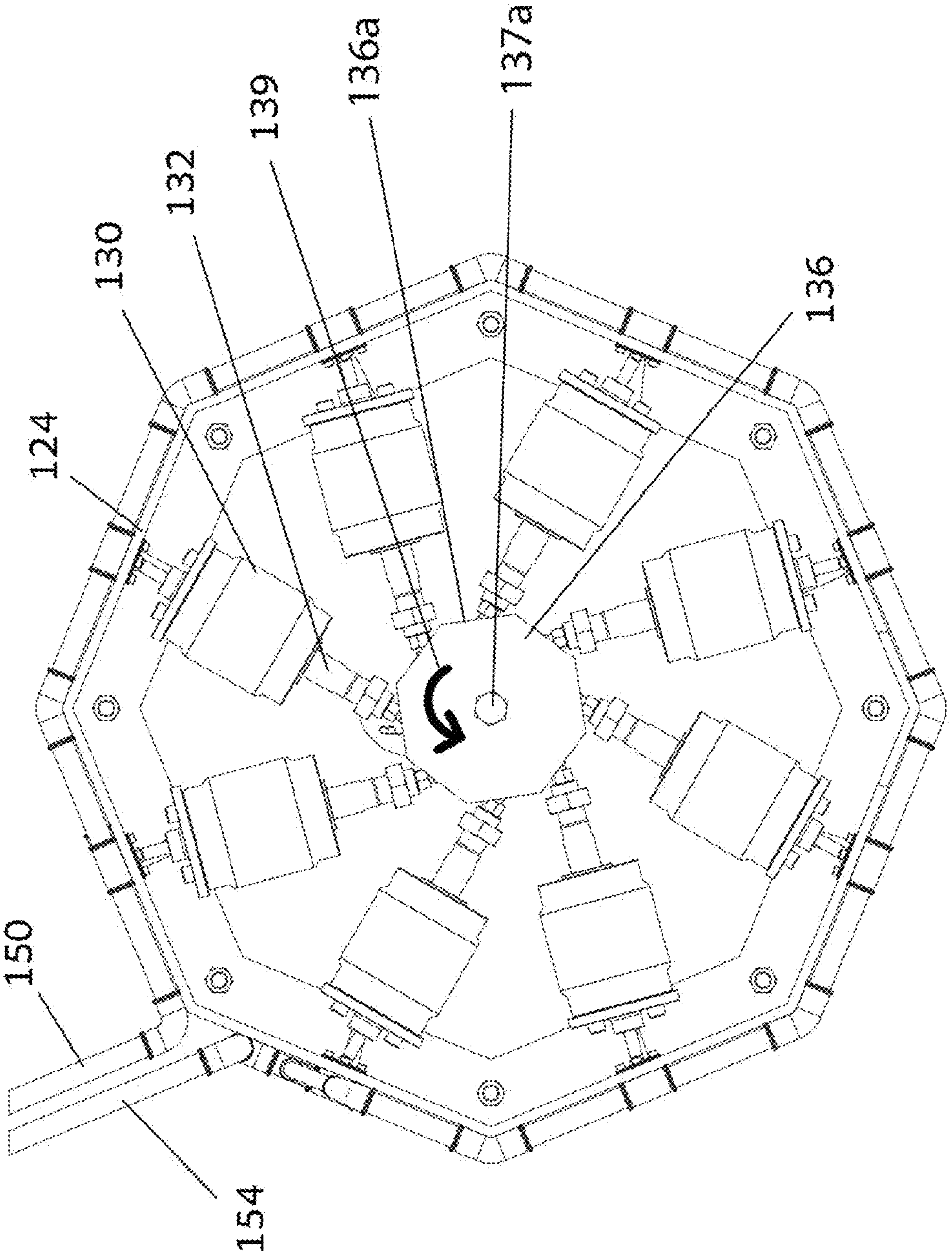
Figure 7A:
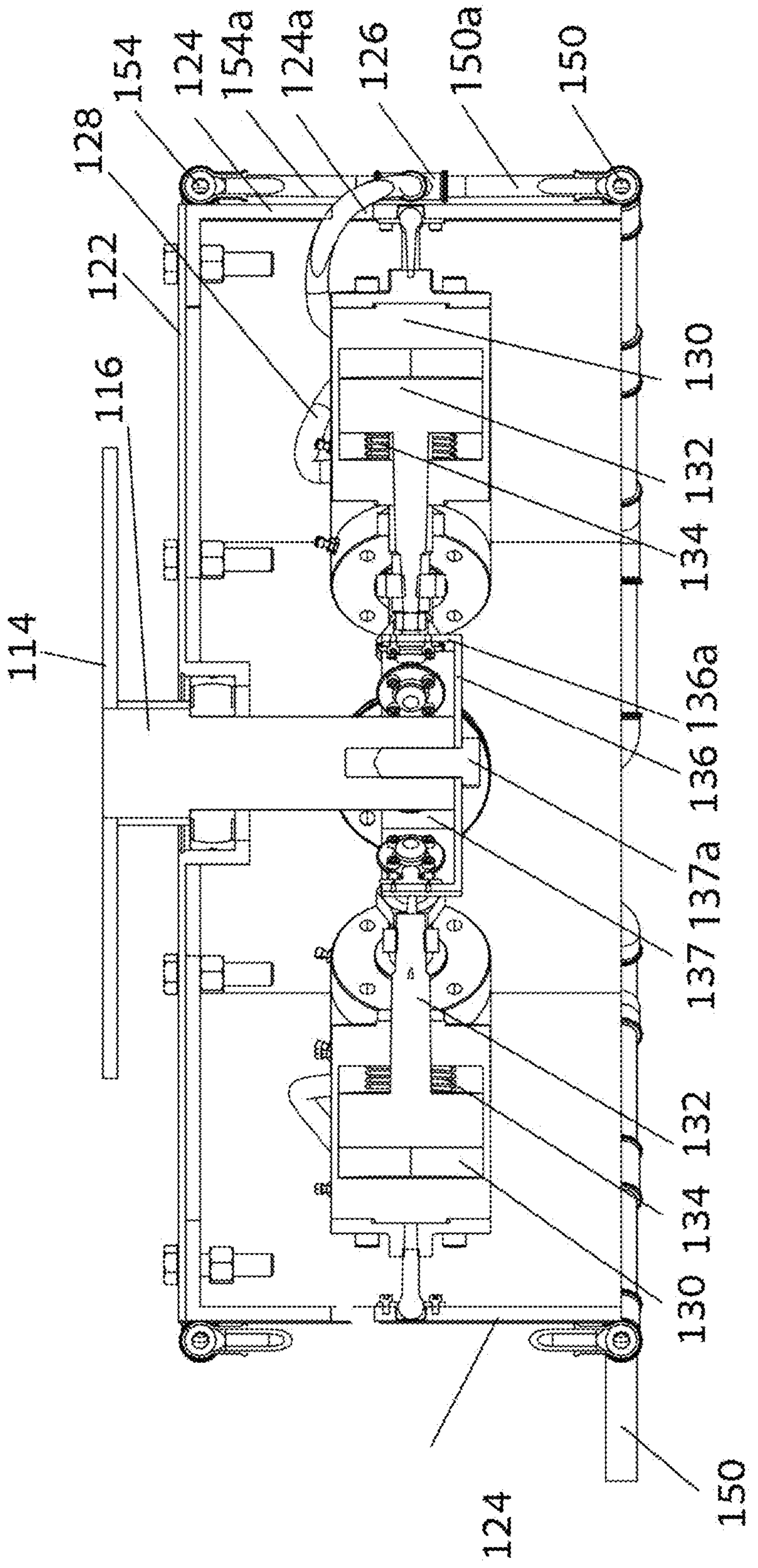
FIGS. 7A and 7B are sectional illustrations of the hydraulic subsystem in a rest state and in a tilt state, respectively.
Figure 7B:
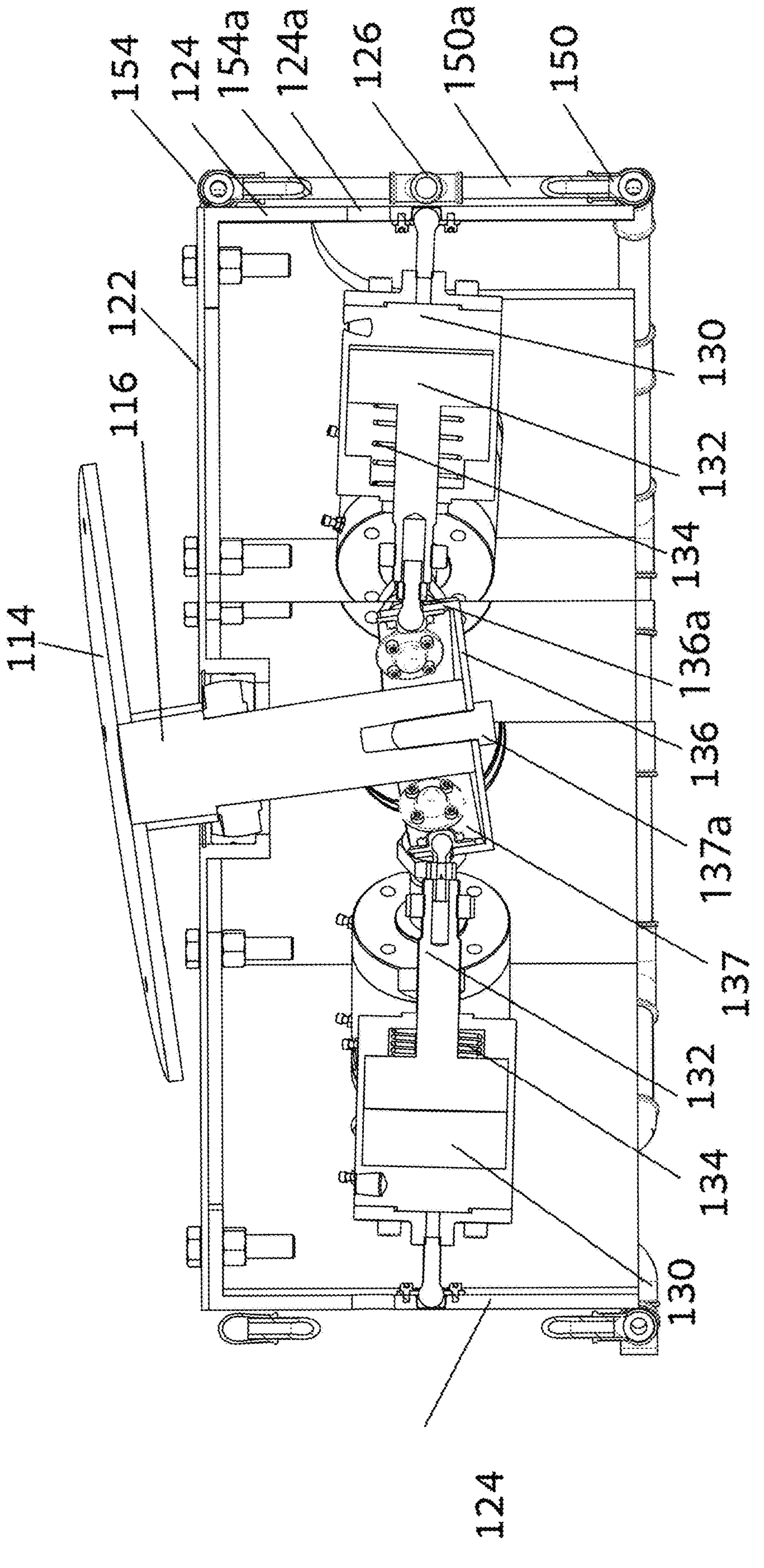

Reference is now additionally made to FIGS. 6A, 6B, and 6C, which are, respectively, bottom view planar illustrations of hydraulic subsystem 120 in a rest state, and in two twist states, respectively. Reference is additionally made to FIGS. 7A and 7B, which are sectional illustrations of hydraulic subsystem 120 in the rest state and in a tilt state, respectively.

As seen, each of conduits 128 is in fluid communication with a hydraulic actuator 130, having a spring return mechanism. Each hydraulic actuator 130 includes a hydraulic cylinder 131 having disposed therein a hydraulic piston 132 associated with a spring 134, such that all pistons 132 are attached to a core 136. Stem 116 of tower 110 is fixedly disposed within a bore 137 at the center of core 136, and is held therein by a pin 137*a*. However, any suitable fastener or fastening mechanism may be used to hold stem 116 fixed within bore 137. In the illustrated embodiment, the number of hydraulic actuators 130 corresponds to the number of sides of the housing. However, in some embodiments, the number of hydraulic actuators may be different from the number of sides of the housing. Typically, the subsystem includes a plurality of hydraulic actuators 130, substantially equidistantly disposed about core 136. In some embodiments, which are less efficient for generation of energy, a single hydraulic actuator may be used, if a mechanism is provided for return of the single piston to the rest state.

As seen from comparison of FIGS. 6A, 6B, and 6C, core 136 is rotatable relative to upper housing surface 122 and to side surfaces 124.

In use, tilting of tower 110 relative to upper housing surface 122 causes rotation of core 136, and corresponding motion of pistons 132. Motion of pistons 132 causes compression of fluid disposed within actuators 130, and the compressed fluid flows, via conduits 128 and 154*a* to pipe 154, and from there to pressurized-fluid tank 152, for generation of electricity. The force of springs 134 pushing against pistons 132 causes the pistons to return to their rest state positions, and allows introduction of atmospheric pressure fluid from reservoir 148, via pipe 150 and conduits 150*a* and 128.

Specifically, FIG. 6A shows hydraulic subsystem 120 in the neutral, or rest, state, when tower 110 is substantially perpendicular to upper housing surface 122. In this orientation, pistons 132 are substantially perpendicular to surfaces 136*a* of core 136, and to side surfaces 124 of the housing. This state is also shown in the sectional illustration of FIG. 7.

In FIG. 6B, tower 110 has pivoted in a first direction, to a first angle relative to upper housing surface 122, resulting in angular rotation of core 136 in a first direction, indicated by arrow 138. Rotation of core 136 causes each piston 132 to be pulled toward core 136, to cover the longer distance between an anchoring point of the corresponding hydraulic actuator to side surface 124 and the surface 136*a* of core 136 to which the specific piston is attached. As such, each of pistons 132 is now disposed at an acute angle □ relative to sides 136*a* of core 136.

In FIG. 6C, tower 110 has rotated in a second, opposing direction, to a second angle relative to upper housing surface 122, resulting in angular rotation of core 136. The tilt of tower 110 causing the state of FIG. 6C is in the opposing direction to the rotation in FIG. 6B. As a result, in FIG. 6C, core 136 rotates in a second direction indicated by arrow 139, which is opposite to the direction 138 of FIG. 6B. Rotation of core 136 causes each piston 132 to be pulled toward core 136, to cover the longer distance between an anchoring point of the corresponding hydraulic actuator to side surface 124 and the surface 136*a* of core 136 to which the specific piston is attached. As such, each of pistons 132 is now disposed at a second obtuse angle β relative to sides 136*a* of core 136.

Extension of pistons 132 out of cylinders 131 causes compression of fluid within the cylinders, which fluid can then be removed from the hydraulic subsystem via pipe 154, and used in generation of electricity.

Following rotation of core 136 in either direction, and pulling pistons 132 outwardly, springs 134 return the pistons to their neutral, or rest, position. The shortening of the distance covered by each hydraulic actuator assists in, or causes, return of tower 110 to the rest state.

As seen from comparison of FIGS. 7A and 7B, in addition to having a rotational degree of freedom, tower 110 and hydraulic subsystem 120 also accommodate tilting motion of the tower, and provide a tilting degree of freedom.

As seen in FIG. 7B, when tower 110, and base 114 thereof, tilt from the vertical, by an angle, at least some pistons 132*a* are drawn outwardly, resulting in compression of fluid within corresponding hydraulic cylinders 131. Other pistons 132*b* are pushed inwardly, resulting in drawing in of fluid from atmospheric-pressure pipe 150.

It is appreciated that the extent of tilt or twist of tower 110 may be limited by mechanical properties of the hydraulic actuator 130.

It is further appreciated that, in order for the tilting or rotation of tower 110 to cause motion of pistons 132, and not corresponding motion of the housing of hydraulic subsystem 120, the hydraulic subsystem must be anchored to the ground, preferably with no degrees of freedom.

It is appreciated that though FIGS. 6A to 7B show a specific arrangement of hydraulic actuators 130, other arrangements are considered within the scope of the present application.

For example, in some embodiments, upper surface 122 of housing 120 may be movable relative to the rest of the housing, and may be functionally associated with tower 110, such that motion of tower 110 causes corresponding motion of upper surface 122. Alternately, an additional plate, functionally associated with tower 110, may be disposed within housing 120, beneath upper surface 122.

In such embodiments, each hydraulic cylinder 131 is attached to a base of housing 120 at a first anchoring point, and each corresponding piston is attached to a lower surface of upper surface 122 or of the plate. As such, when the tower is in the rest state, longitudinal axes of the pistons are substantially parallel to a longitudinal axis of the tower. Rotation or tilting of tower 110, causes corresponding rotation or tilting of upper surface 122 or of the plate, relative to the remainder of housing 122. This changes a distance between the first anchoring point and the second anchoring point, as explained hereinabove, resulting in motion of hydraulic pistons 132 relative to their hydraulic cylinders 131.

Reference is additionally made to FIG. 8, which is a schematic diagram of fluid communications between hydraulic subsystem 120 and electricity-generating subsystem 140, according to some embodiments of the disclosed technology.

As seen in FIG. 8, pressurized fluid tank 152 is connected to electricity generator 156 by a fluid line 170, having a solenoid valve 172 disposed thereon. Solenoid valve 172 is adapted to open, and to allow fluid flow from tank 152 to generator 156, when a sufficient volume of pressurized fluid has accumulated in tank 152.

Electricity generator 156 is connected to atmospheric-pressure fluid reservoir 148 via a fluid line 174, the line including a unidirectional valve 176 allowing fluid flow from the generator to the reservoir, but not in the reverse direction.

Fluid at atmospheric pressure flows out of atmospheric-pressure fluid reservoir 148 into atmospheric-pressure pipe 150. Pipe 150 includes a plurality of multi-directional valves 178 allowing fluid flow from pipe 150 into conduits **150*a*, while preventing reverse fluid flow from the conduits 150*a* back into pipe 150, or upstream flow in pipe 150**.

Typically, conduits **150*a* each include a unidirectional valve 180 allowing fluid flow from pipe 150 toward each hydraulic actuator 130 and corresponding hydraulic piston, and preventing fluid flow in the opposite direction. This ensures that pressurized fluid, which is supposed to exit the hydraulic actuator, does not flow back to reservoir 148**.

As mentioned hereinabove, conduits **150*a* are connected, via multi-directional valve 126, to conduits 128, which extend to hydraulic actuators 130 and corresponding hydraulic pistons. Multi-directional valves 126 also connect conduits 128 to conduits 154*a*, each of which typically includes an additional unidirectional valve 182 allowing fluid flow from conduit 154*a* to high-pressure pipe 154**, while preventing flow in the opposite direction.

Typically, each conduit **154*a* is connected to high-pressure pipe 154 via a multi-directional valve 184, ensuring that fluid flows from conduit 154*a* and downstream in pipe 154, toward pressurized-fluid tank 152, and not in the opposing direction. Pipe 154 further includes a plurality of unidirectional valves 186, all ensuring that pressurized fluid will flow only toward tank 152**, and not in the opposing direction.

It is a particular feature of the disclosed technology that conduits 128 are used interchangeably for passage of atmospheric-pressure fluid to actuators 130, and of high-pressure fluid out of the actuators. Use of a single conduit for both types of fluid is facilitated by operation of valves 180, 126, and 182, which ensure correct fluid flow within the system.

When a force 190 in a first direction is applied to one of actuators 130, and pushes the corresponding piston to compress, or pressurize, fluid disposed within the cylinder, the high-pressure fluid flows from actuator 130 to pressurized-fluid tank 152 via conduits 128, multidirectional valve 126, conduit **154*a*, unidirectional valve 182 and multidirectional valve(s) 184, high-pressure pipe 150, and unidirectional valve(s) 186**.

When a force 192 in a second, opposing, direction is applied to one of actuators 130, and pulls the corresponding piston, vacuum formed in the cylinder 131 causes pulling of fluid at atmospheric pressure from atmospheric-pressure fluid reservoir 148 into the hydraulic actuator, via pipe 150, multidirectional valve(s) 180, conduit **150*a*, unidirectional valve 182, multi-directional valve 126, and conduit 128**.

It is appreciated that though FIGS. 6A to 7B show an electricity-generating assembly including hydraulic actuators, other arrangements are considered within the scope of the present application.

For example, in some embodiments, an array of linear actuators or piezoelectric motors may replace hydraulic actuators 130. In such embodiments, the linear actuators or piezoelectric motors may be anchored to the housing 120 and plate 114 in a similar manner to that described for hydraulic cylinders 131 and hydraulic pistons 132. In this arrangement, tilting or rotating of the tower 110, causes corresponding extension and/or retraction of at least some of the linear actuators or piezoelectric motors. The extension and retraction results in generation of electricity, which can be utilized, as explained in further detail hereinbelow.

Figure 9A:
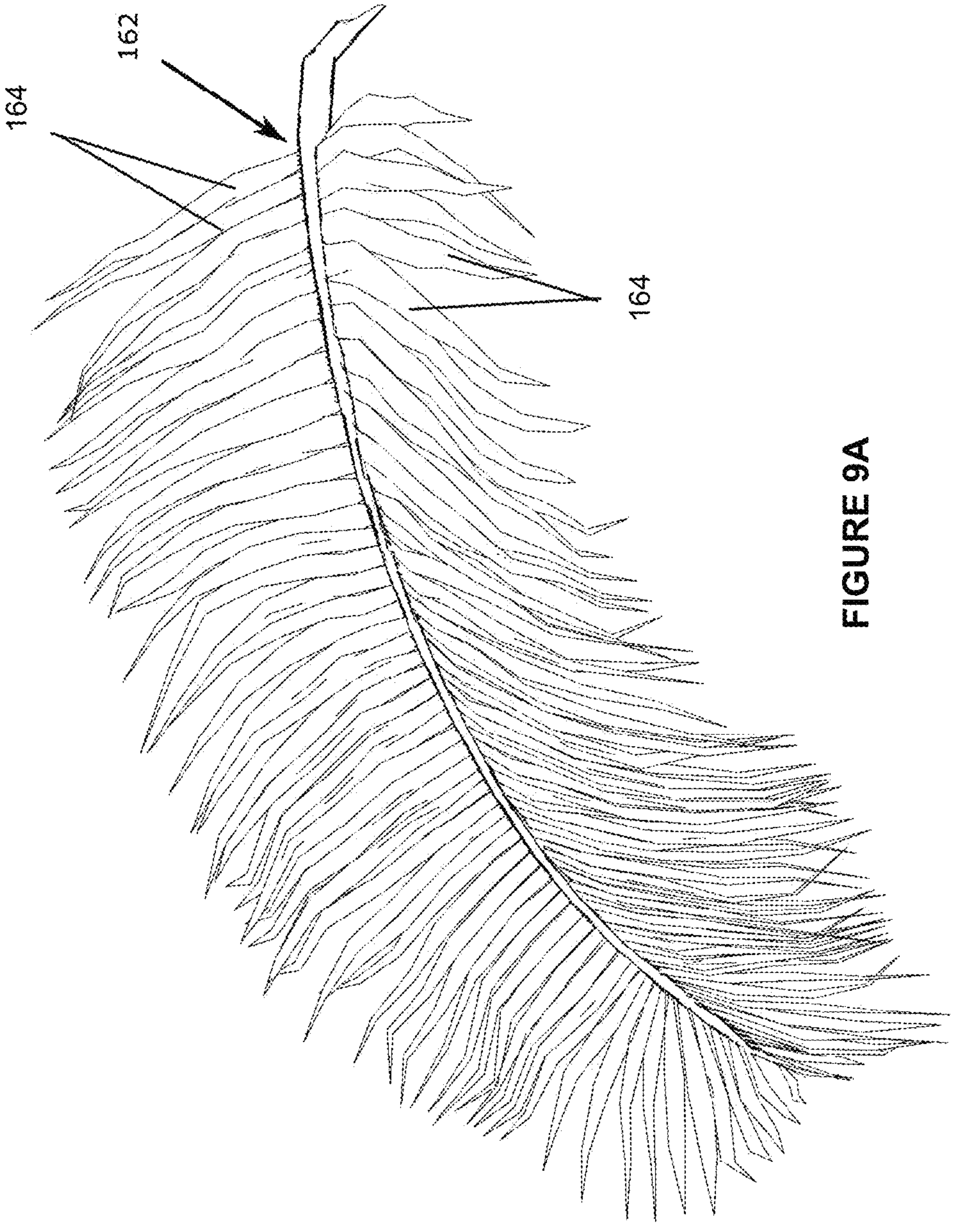
FIGS. 9A and 9B are schematic illustrations of elements of the wind-harvesting assembly, according to some embodiments of the disclosed technology.
Figure 9B:
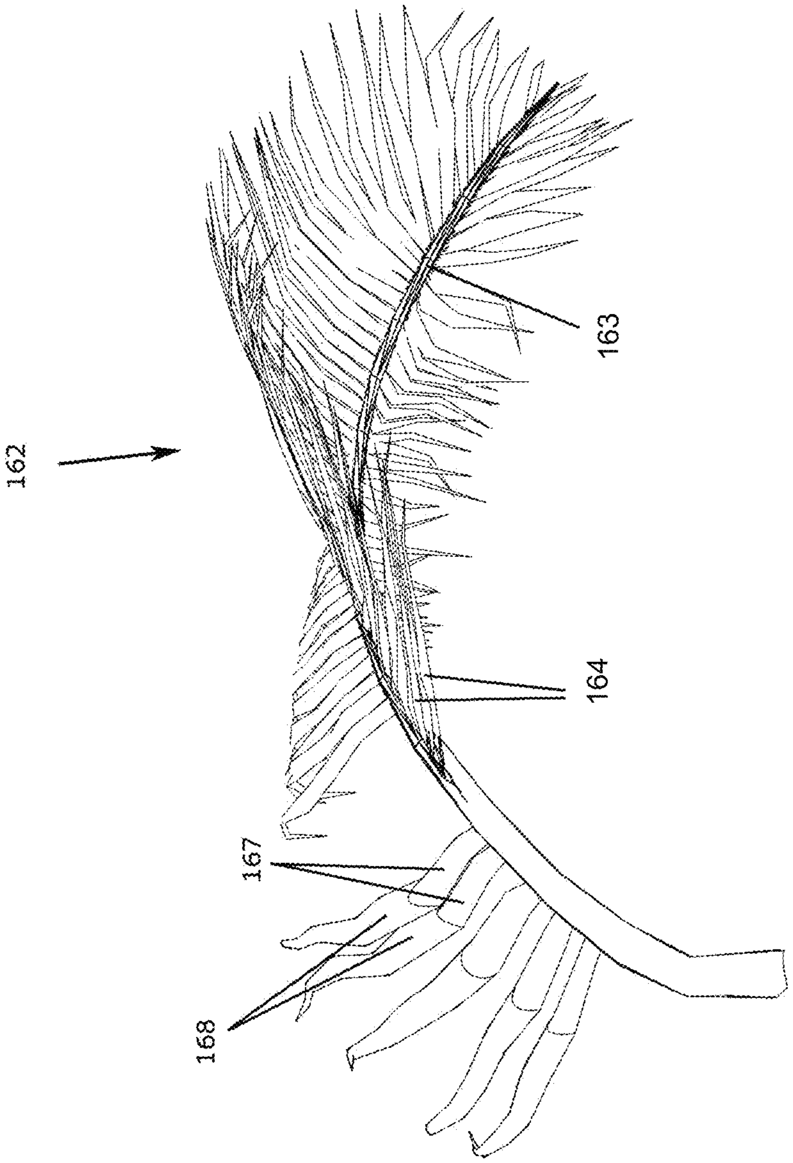

Reference is now made to FIGS. 9A and 9B, which are schematic illustrations of elements of wind-harvesting assembly 160, according to some embodiments of the disclosed technology.

As seen, and as discussed hereinabove, wind-harvesting assembly 160 is designed to look like a palm-tree, to allow system 100 to blend into nature. As seen in FIGS. 9A and 9B, the wind-harvesting assembly includes a plurality of branches 162, each designed to look like a palm frond. Each branch 162 includes a central stem 163 and a plurality of leaf elements 164.

As seen clearly in FIG. 9B, at least some, and typically all, of leaf elements 164 include a main body 167 having attached thereto a second layer 168, such that main body 167 and second layer 168 together form a wind receiving pocket.

When wind blows, air gets caught in the wind receiving pockets, pulling the entire branch 162 to one side (the direction to which the wind is blowing). This in turn changes the balance of forces applied to the upper end of tower 110, and may cause the tower to tilt, thereby causing pressurizing of fluid by hydraulic subsystem 120.

Returning to FIG. 2A, it is seen that branches 162 are oriented in many different directions, as in a palm tree. As a result, wind can be harvested regardless of the direction in which the wind is blowing. Additionally, the chaotic nature of the motion of branches 162 ensures that the tower 110 will be pulled in different directions, and will rarely be at rest, thus enhancing energy harvesting by the system.

It is appreciated that in some embodiments, branches 162 may be shaped like branches of a different tree, and leaf elements 164 may be shaped like the leaves of a different tree, such as a poplar tree, a maple tree, or an edible-fruit bearing tree, for example.

It is appreciated that in some embodiments, branches 162 may be replaced by other wind-engaging elements, which may have a shape or style different from that of a palm frond or tree branch, or may not include wind capturing pockets. For example, elements 162 may include a plurality of wind capturing surfaces such as parachutes or kites.

Figure 10:
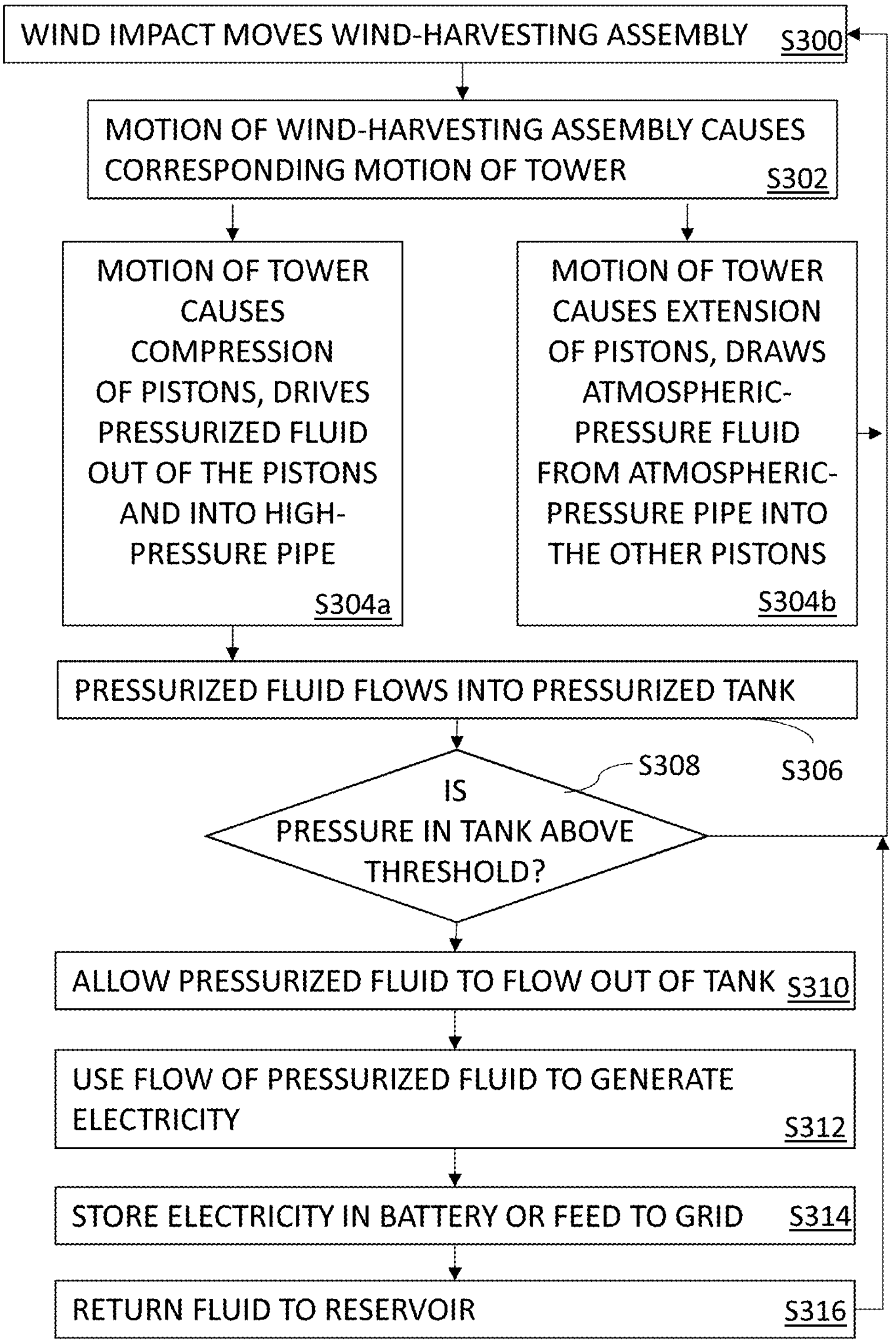
FIG. 10 is a schematic flow chart of a method for generating electricity using a system according to embodiments of the disclosed technology including a hydraulic subsystem.

Reference is now made to FIG. 10, which is a schematic flow chart of a method for generating electricity using a system according to embodiments of the disclosed technology including a hydraulic subsystem, such as any of the systems of FIGS. 2A to 8.

As seen at step S300, force of the wind impacts the wind-harvesting assembly 160 of system 100, from any one of a plurality of directions. At step S302, the wind-harvesting assembly moves in the direction of the wind, causing corresponding movement of the tower 110 in that direction.

At step S304*a*, motion of the tower 110 causes compression of some pistons of hydraulic subsystem 120, typically pistons oriented in a direction opposite to that in which the wind is blowing. Compression of the pistons drives pressurized fluid out of the piston toward the high-pressure pipe 154. The direction of flow of the high-pressure fluid is controlled by the unidirectional valves disposed on the lines, as described hereinabove with respect to FIGS. 4 and 8.

At step S304*b*, motion of the tower may also cause extension, or drawing out, of other pistons of hydraulic subsystem 120, typically pistons which face in the direction in which the wind is blowing. Extension of pistons draws atmospheric-pressure fluid from reservoir 148 into the pistons, via atmospheric-pressure pipe 150.

At step S306, pressurized fluid flows through high-pressure pipe 154 to pressurized-fluid tank 152, thereby increasing the pressure in tank 152 with each motion of tower 110.

At step S308, a control system, which may be implemented by a processor executing instructions stored in a memory component, evaluates whether pressure in the pressurized-fluid tank has reached a predetermined threshold value.

If the pressure in the tank has reached the predetermined threshold value, at step S310 the control system causes a valve, such as a solenoid valve, to be opened, thereby to allow pressurized fluid to flow out of the pressurized-fluid tank.

At step S312, the flow of the pressurized fluid is used to generate electricity, for example by rotating a turbine that is connected to a hydro-powered electricity generator.

At step S314, the generated electricity is stored in a battery, or is fed into an electrical grid.

At step S316, the fluid used to generate electricity, which is now again at atmospheric pressure, is returned to the atmospheric-pressure reservoir, and can be used in subsequent cycles of operation of the system.

Returning to step S308, if the pressure in the pressurized-fluid tank is below the predetermined threshold value, flow returns to step S300, for harvesting of additional wind energy and further pressurizing of fluid in the tank.

Figure 11:
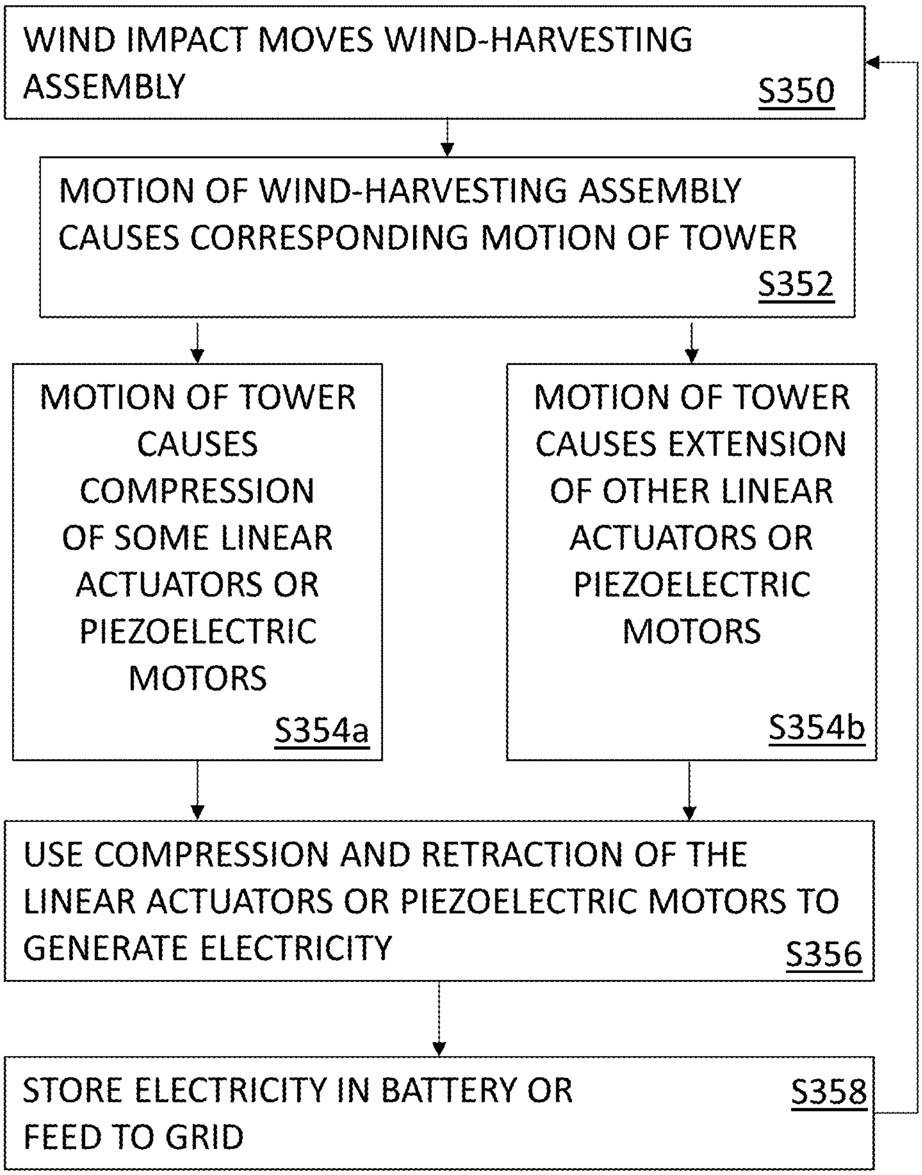
FIG. 11 is a schematic flow chart of a method for generating electricity using a system according to embodiments of the disclosed technology including an array of linear actuators or piezoelectric motors.

Reference is now made to FIG. 11, which is a schematic flow chart of a method for generating electricity using a system according to embodiments of the disclosed technology including an array of linear actuators or piezoelectric motors.

As seen at step S350, force of the wind impacts the wind-harvesting assembly 160 of system 100, from any one of a plurality of directions. At step S352, the wind-harvesting assembly moves in the direction of the wind, causing corresponding movement of the tower 110 in that direction.

At step S354*a*, motion of the tower 110 causes compression of some linear actuators or piezoelectric motors. At step S304*b*, motion of the tower may also cause extension of other linear actuators or piezoelectric motors.

At step S356, compression and retraction of the linear actuators or piezoelectric motors is used to generate electricity.

At step S358, the generated electricity is stored in a battery, or is fed into an electrical grid.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. Similarly, the content of a claim depending from one or more particular claims may generally depend from the other, unspecified claims, or be combined with the content thereof, absent any specific, manifest incompatibility therebetween.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system of generating electricity from wind energy, the system comprising:

- an elongate tower, having a ground end and an upper end, the tower having a rest position in which it is substantially perpendicular to a ground surface;
- a wind-harvesting assembly including at least one wind-engaging element attached to the tower, the at least one wind-engaging element adapted to be impacted by wind, and to cause the tower to move from the rest position;
- a hydraulic subsystem, including:
  - at least one hydraulic actuator functionally associated with the ground end of the tower, each of the at least one hydraulic actuator including a hydraulic cylinder having a corresponding piston disposed therein;
  - a housing; and
  - a central core, which is tiltable and rotatable relative to the housing,
  - wherein each of the at least one hydraulic cylinder is attached to the housing at a first anchoring point, and each corresponding piston is attached to the central core at a second anchoring point, such that at least one longitudinal axis of the at least one piston is substantially perpendicular to a longitudinal axis of the tower,
  - wherein motion of the central core relative to the housing changes a distance between the first anchoring point and the second anchoring point, resulting in motion of the corresponding at least one hydraulic piston relative to the at least one hydraulic cylinder, and
- wherein motion of the tower from the rest position causes motion of at least one the piston and pressurizing of fluid in at least one corresponding the hydraulic actuator; and
- an electricity-generating subsystem, functionally associated with the hydraulic subsystem and adapted to use the pressurized fluid to generate electricity.

2. The system of claim 1, wherein the at least one hydraulic actuator comprises a single hydraulic actuator, wherein motion of the tower from the rest position causes motion of the piston and pressurizing of fluid in the hydraulic actuator.

3. The system of claim 1, wherein the at least one hydraulic actuator comprises a plurality of hydraulic actuators, wherein motion of the tower from the rest position causes motion of a subset of the pistons and pressurizing of fluid in corresponding ones of the plurality of hydraulic actuators.

4. The system of claim 3, wherein the plurality of hydraulic actuators are disposed circumferentially about, or beneath, the ground end of the elongate tower.

5. The system of claim 1, wherein at least one axis of motion of the at least one piston within the at least one hydraulic actuator is substantially perpendicular to a longitudinal axis of the elongate tower.

6. The system of claim 1, wherein at least one axis of motion of the at least one piston within the at least one hydraulic actuator is substantially parallel to a longitudinal axis of the elongate tower.

7. The system of claim 1, wherein the wind-harvesting assembly has a natural appearance that blends into the view.

8. The system of claim 7, wherein the wind-harvesting assembly comprises a plurality of branches extending outwardly from the elongate tower, each of the plurality of branches terminating in at least one wind-engaging leaf, such that the wind-harvesting assembly has the appearance of a tree-top and includes a plurality of wind-engaging elements.

9. The system of claim 1, wherein, upon being impacted by the wind, the wind-harvesting assembly is adapted to cause the tower to tilt from the rest position; or to rotate relative to the rest position.

10. The system of claim 1, the electricity-generating subsystem comprising:

an atmospheric-pressure fluid reservoir, in fluid communication with the hydraulic subsystem and adapted to provide fluid, at atmospheric pressure, to the at least one hydraulic actuator;

a pressurized-fluid tank, in fluid communication with the hydraulic sub-system and adapted to receive pressurized fluid from the at least one hydraulic actuator; and an electricity generator adapted to receive pressurized fluid from the pressurized-fluid tank, to use pressure of the fluid to generate electricity, and, following the generating of electricity, to provide fluid at atmospheric pressure to the atmospheric-pressure fluid reservoir.

11. The system of claim 10, further comprising at least one of:

a solenoid valve disposed between the pressurized-fluid tank and the electricity generator; and at least one unidirectional valve controlling flow of fluid from the electricity generator to the atmospheric-pressure fluid reservoir.

12. The system of claim 10, wherein each of the at least one hydraulic actuator is in fluid communication with the atmospheric-pressure fluid reservoir and with the pressurized-fluid tank via a single conduit, and wherein flow of atmospheric pressure fluid and pressurized fluid through the conduit is controlled by a plurality of valves disposed along fluid lines between the atmospheric-pressure fluid reservoir and the at least one hydraulic actuator, and between the at least one hydraulic actuator and the pressurized-fluid tank.

13. The system of claim 1, wherein the tower is fixedly attached to the central core, and wherein rotation of the tower relative to the housing causes rotation of the central core, and relative motion between at least the one of the at least one hydraulic cylinder and corresponding at least one hydraulic piston.

14. The system of claim 1, wherein tilting of the tower relative to the housing causes tilting of the central core, and relative motion between at least one of the at least one hydraulic cylinder and corresponding at least one hydraulic piston.

15. The system of claim 1, wherein:

the hydraulic subsystem further includes a housing having a base surface, the housing accommodating the at least one hydraulic actuator;

the elongate tower is functionally associated with a plate, tiltable and rotatable relative to the housing; and each of the at least one hydraulic cylinder is attached to the base surface of the housing at a first anchoring point, and each corresponding piston is attached to a lower surface of the base plate, such that at least one longitudinal axis of the at least one piston is substantially parallel to a longitudinal axis of the tower, wherein motion of the base plate relative to the housing changes a distance between the first anchoring point and the second anchoring point, resulting in motion of the corresponding at least one hydraulic piston relative to the at least one hydraulic cylinder.

16. The system of claim 1, wherein a range of motion of the at least one piston is adapted to limit an extent of motion of the tower.

17. The system of claim 1, wherein, upon being impacted by the wind, the wind-harvesting assembly is adapted to cause the tower to rotate relative to the rest position.

* * * * *